US006466557B1

(12) United States Patent
Doi

(10) Patent No.: US 6,466,557 B1
(45) Date of Patent: Oct. 15, 2002

(54) TRANSMISSION CHANNEL ALLOCATION METHOD AND ALLOCATION APPARATUS

(75) Inventor: Yoshiharu Doi, Gifu (JP)

(73) Assignee: Sanyo Electric Co., Ltd., Moriguchi (JP)

(*) Notice: Subject to any disclaimer, the term of this patent is extended or adjusted under 35 U.S.C. 154(b) by 0 days.

(21) Appl. No.: 09/115,179

(22) Filed: Jul. 14, 1998

(30) Foreign Application Priority Data

| Jul. 14, 1997 | (JP) | ................................. 9-188331 |
| Oct. 28, 1997 | (JP) | ................................. 9-295405 |
| Feb. 26, 1998 | (JP) | ................................ 10-45180 |
| Jul. 1, 1998 | (JP) | ............................... 10-186312 |

(51) Int. Cl.[7] .................................................. H04J 3/16
(52) U.S. Cl. ........................ 370/332; 370/341; 370/437; 370/439; 455/63; 455/450; 455/509
(58) Field of Search ................................ 370/329, 330, 370/332, 334, 335, 339, 341, 342, 343, 347, 436, 437, 439, 444; 455/63, 450, 452, 454, 509

(56) References Cited

U.S. PATENT DOCUMENTS

| 4,995,033 A | * | 2/1991 | Ikemori ........................ 370/439 |
| 5,229,850 A | * | 7/1993 | Toyoshima .................. 358/108 |
| 5,907,543 A | * | 5/1999 | Jeon et al. .................... 370/335 |
| 5,937,002 A | * | 8/1999 | Andersson et al. ......... 370/329 |
| 6,018,663 A | * | 1/2000 | Karlsson et al. ............. 370/332 |

FOREIGN PATENT DOCUMENTS

| JP | 3-107218 | 5/1991 | ............ H04B/7/26 |
| JP | 7-38963 | 2/1995 | ............ H04Q/7/38 |
| JP | 7-505017 | 6/1995 | |
| JP | 7-170561 | 7/1995 | |
| JP | 8-204673 | 8/1996 | ............ H04J/3/16 |
| JP | 9-65414 | 3/1997 | |
| JP | 9-215052 | 8/1997 | ............ H04Q/7/28 |

OTHER PUBLICATIONS

Hiroshi Suzuki "Path Division Multiple Access (PDMA) Mobile Radio Communication Systems"—Technical Report of IEICE, RCS 93–84 (Jan. 17, 1994) pp. 37–44.*
Hiroshi Suzuki *"Path Division Multiple Access (PDMA) Mobile Radio Communication Systems"*—Technical Report of IEICE, RCS 93–84 (Jan. 17, 1994) pp. 37–44.
WO 93/12590, PCT Application, published Jun. 24, 1993.

* cited by examiner

*Primary Examiner*—Douglas Olms
*Assistant Examiner*—Shick Hom
(74) *Attorney, Agent, or Firm*—Armstrong, Westerman & Hattori, LLP

(57) ABSTRACT

A PDMA (Path Division Multiple Access) channel allocation method is provided that allows setting of a channel to a user requesting connection using a reception signal vector, a weight vector, or a direction of arrival. A channel in the i-th time slot not used by another user is allocated to the user requesting connection. The reception signal vector thereof is measured and stored in a memory. The reception signal vector of the channel of a user that has already been connected to that time slot is compared with the reception signal vector of the new user. If interference occurs, the new user is allocated to a channel of another time slot.

15 Claims, 40 Drawing Sheets

| $f_1$ | CHANNEL(1,1) USER 1 | CHANNEL(2,1) | |
| $f_1$ | CHANNEL(1,2) USER 1 | CHANNEL(2,2) | |
| $f_1$ | CHANNEL(1,3) | CHANNEL(2,3) | |

→ TIME

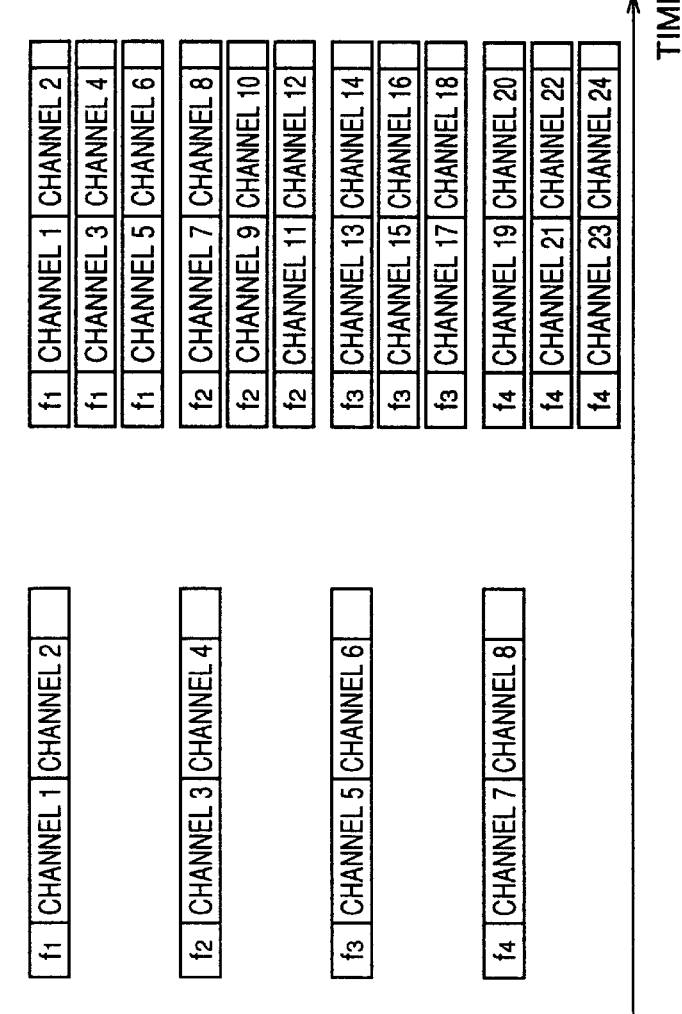

TRANSMISSION CHANNEL ALLOCATION METHOD AND ALLOCATION APPARATUS

BACKGROUND OF THE INVENTION

1. Field of the Invention

The present invention relates to a transmission channel allocation method and an apparatus thereof More particularly, the present invention relates to a transmission channel allocation method and apparatus for allocating a channel to be used for transmission to a user requesting connection in a PDMA (Path Division Multiple Access) communication system where a plurality of users transmit and receive data such as audio and video using channels of the same frequency and the same time.

2. Description of the Background Art

In the field of the mobile communication systems such as portable telephones that have become extremely popular recently, various transmission channel allocation methods have been proposed to effectively use the frequencies. Some thereof are actually in practice.

FIGS. 46A–46C show the channel arrangements in various communication systems of Frequency Division Multiple Access (FDMA), Time Division Multiple Access (TDMA), and PDMA. The systems of FDMA, TDMA, and PDMA will be described briefly with reference to FIGS. 46A–46C. Referring to FIG. 46A corresponding to the FDMA system, the analog signals of users 1–4 are frequency-divided to be transmitted in radio waves of different frequencies f1–f4. The signals of respective users 1–4 are separated by frequency filters.

Referring to FIG. 46B corresponding to the TDMA system, the digitized signals of respective user are time-divided and transmitted in radio waves of different frequencies f1–f4 at every constant period of time (time slot). The signals of respective users are separated by frequency filters and by time synchronization between a base station and each user's mobile terminal device.

Recently, the PDMA system has been proposed to improve the radio wave frequency usability to comply with the spread of portable telephones. In the PDMA system shown in FIG. 46C, one time slot of the same frequency is divided spatially to transmit data of a plurality of users. The signals of respective users are separated using frequency filters, time synchronization between a base station and each user's mobile terminal device, and a mutual interference removal apparatuses such as adaptive arrays.

FIG. 47 shows the reception system of a conventional base station for use in PDMA. Four antennas 3–6 are provided to distinguish between user 1 and user 2. The outputs of respective antennas are applied to frequency conversion circuits 7–10 to be frequency-converted by a local oscillation signal Lo and then applied to an A/D converter 11. The signals are converted into digital signals to be applied to a DSP (Digital Signal Processor) 12.

DSP 12 includes a channel allocation standard calculator 121, a channel allocation apparatus 122, and adaptive arrays 131 and 132. Channel allocation standard calculator 121 calculates data in advance to identify whether the signals of the two users can be separated by the adaptive arrays. In response to the calculation result, channel allocation apparatus 122 provides to each of adaptive arrays 131 and 132 the channel allocation information including user information that selects the frequency and the time. Each of adaptive arrays 131 and 132 is formed of, for example, a signal combine circuit as shown in FIG. 48. The signal of each user can be separated by selecting only the signal of a particular user.

FIG. 48 is a block diagram of a conventional adaptive array. In this example, in order to extract the signal of a certain user from input signals corresponding to a plurality of user signals, four input ports 14–17 are provided. The signals applied to input ports 14–17 are provided to a weight vector calculator 18 as well as to respective multipliers 20–23. Weight vector calculator 18 uses the input signals as well as a training signal corresponding to the signal of a certain user prestored in a memory 19 or the output of an adder 24 to calculate weight vectors w1–w4. Multipliers 20–23 multiply the input signals of input ports 14–17 by weight vectors w1–w4, respectively. The multiplied results are sent to adder 24. Adder 24 adds the output signals of multipliers 20–23. The added result is output to an output port 25 and (or) weight vector calculator 18.

The reception signal vector of the PDMA communication will be described briefly hereinafter. When signals $As_1(t)$ and $Bs_1(t)$ from user 1 are received on two antennas, the reception signals $x_1(t)$ and $x_2(t)$ of respective antennas are represented by the following equation.

$$x_1(t)=As_1(t)+n_1(t)$$

$$x_2(t)=Bs_1(t)+n_2(t)$$

In the above equations, A and B are coefficients of the signals sent from user 1 and received by respective antennas, and $n_1(t)$ and $n_2(t)$ are noise components. Here, reception signal vector U1 of user 1 is represented by the following equation.

$$U1 = \begin{bmatrix} A \\ B \end{bmatrix}$$

When signals $Cs_2(t)$ and $Ds_2(t)$ from user 2 are received on the above two antennas, reception signals $x_1(t)$ and $x_2(t)$ of respective antennas are represented by the following equations.

$$x_1(t)=As_1(t)+Cs_2(t)+n_1(t)$$

$$x_2(t)=Bs_1(t)+Ds_2(t)+n_2(t)$$

Here, reception signal vector U2 of user 2 is represented by the following equation.

$$U2 = \begin{bmatrix} C \\ D \end{bmatrix}$$

When there is only one user, reception signal vector $U_1$ can be obtained easily. However, when there are two users, it becomes difficult to separate respective signals since the signals will be mixed. Furthermore, a plurality of reception signals may be input from one user. If the correlation value of reception signal vectors U1 and U2 is a small value, the signals from two users can be separated with the adaptive arrays of FIG. 48. Transmission can be carried out using channels of the same frequency and same time (time slot). However, when the correlation value of reception signal vectors U1 and U2 is a large value, it is difficult to separate the signals with the adaptive arrays. Therefore, communication cannot be carried out using channels of the same frequency and the same time (time slot).

The weight vector will be described hereinafter. When respective signals $S_1(t)$ and $S_2(t)$ from users 1 and 2 are received on the two antennas, reception signals $x_1(t)$ and $x_2$ (t) of respective antennas are represented by the following equations.

$$x_1(t)=As_1(t)+Cs_2(t)+n_1(t)$$

$$x_2(t)=Bs_1(t)+Ds_2(t)+n_2(t)$$

When the signal of user 1 is extracted by adaptive array 131 shown in FIG. 47 in accordance with the information from channel allocation apparatus 122, that is, when the signals $x_1$ (t) and $x_2$ (t) are input to input ports 14 and 15 and weight vector calculator 18 calculates ideal weights $w_{11}$ and $w_{12}$ to extract the signal transmitted from user 1, an output signal $y_1$ (t) is represented by the following equation.

$$y_1(t)=w_{11}(t)x_1(t)+w_{12}(t)x_2(t)=s_1(t)+n(t)$$

Thus, weight vector $W_1$ of user 1 is represented as follows.

$$W_1 = \begin{bmatrix} w_{11} \\ w_{12} \end{bmatrix}$$

When the signal of user 2 is extracted by adaptive array 132 shown in FIG. 47 in accordance with the information from channel allocation apparatus 122, on the other hand, an output signal $y_2$ (t) is represented by the following equation.

$$y_2(t)=w_{21}(t)x_1(t)+w_{22}(t)x_2(t)=s_2(t)+n(t)$$

Thus, weight vector $W_2$ of user 2 is represented as follows.

$$W_2 = \begin{bmatrix} w_{21} \\ w_{22} \end{bmatrix}$$

If the correlation value of weight vectors of the two users is a large value, it is difficult to separate the signals transmitted from the two users with adaptive arrays 131 and 132. As a result, communication can not be carried out using channels of the same frequency and same time.

The channel capacity of the communication system is coming to its limit by the rapid spread of portable telephones. In the future, it is expected that the channel allocation requests from users will exceed the number of available transmission channels. The operation of the mobile communication system will be jeopardized unless some reasonable measures are taken.

There is also a case where a certain user wishes to transmit/receive data at a speed faster than the communication rate of other users. To comply for this requirement in a conventional case in the TDMA communication system of FIG. 46B, the communication speed was doubled by using two channels, i.e., channel 1 and channel 2, of a frequency f1 for the communication of one user. When this method is to be applied to the PDMA communication system of FIG. 46C, channel 1 and channel 2 of the same frequency f1 and of different time slots will be allocated for the communication of one user.

However, from the standpoint of utilizing the channel efficiently, a method of allocating double channels to one user without spanning over different time slots is required.

SUMMARY OF THE INVENTION

In view of the foregoing, an object of the present invention is to provide a transmission channel allocation method and allocation apparatus that allows efficient allocation of a transmission channel for a user requesting connection without substantial interference between signals.

Another object of the present invention is to provide a transmission channel allocation method and apparatus that allows reasonable allocation of a transmission channel when the channel capacity arrives at its limit.

A further object of the present invention is to provide a PDMA communication system that facilitates increase in the user communication speed using path multiplex.

According to an aspect of the present invention, the method of allocating to a plurality of terminal devices channels for multiple connection to a base station in response to connection requests from the plurality of terminal devices includes the steps of comparing an interference amount between signals of the plurality of terminal devices with a standard value, and allocating a channel in which interference does not substantially occur to the plurality of terminal devices according to the determination result.

According to another aspect of the present invention, the method of allocating to a plurality of terminal devices channels for multiple connection to a base station respectively in response to connection requests from the plurality of terminal devices includes the steps of comparing an interference amount between a signal of a terminal device that has already been connected and a signal of a terminal device that is newly requesting connection with a standard value, and allocating an empty channel in which interference does not substantially occur to the terminal device newly requesting connection.

According to a further aspect of the present invention, when connection priority is pre-assigned to the plurality of terminal devices and there is no empty channel to be allocated, the allocation method further includes the step of forcedly allocating a channel that is allocated to an already-connected terminal device of lower priority to the terminal device of higher priority newly requesting connection as long as interference does not substantially occur.

According to still another aspect of the present invention, the method of allocating to a plurality of terminal devices channels for multiple connection to a base station respectively in response to connection requests from the plurality of terminal devices includes the steps of comparing an interference amount between the signals of terminal devices that have already been connected with a standard value, and shifting one terminal device to another channel in which interference does not substantially occur when the interference occurs between signals of the terminal devices that have already been connected.

According to a still further aspect of the present invention, when connection priority is pre-assigned to the plurality of terminal devices, the shifting step includes the step of shifting a terminal device of a lower priority out of the terminal devices causing interference.

According to yet a further aspect of the present invention, the apparatus of allocating to a plurality of terminal devices channels for multiple connection to a base station in response to connection requests from the plurality of terminal devices includes a circuit for comparing an interference amount between signals of the plurality of terminal devices with a standard value, and a circuit for allocating channels in which interference does not substantially occur to the plurality of terminal devices according to the determination result.

According to yet another aspect of the present invention, a radio communication system for transmitting and receiving signals, while allocating to a plurality of terminal devices channels for multiple connection to a base station respectively in response to connection requests from the plurality of terminal devices includes a circuit for comparing an interference amount between signals of the plurality of terminal devices with a standard value, a circuit for allocating channels in which interference does not substantially occur to the plurality of terminal devices according to the determination result, and a circuit for separating signals of the plurality of terminal devices to which the channels are allocated from each other for output.

According to yet a still further aspect of the present invention, the method of allocating to a plurality of terminal devices channels for multiple connection to a base station respectively in response to connection requests from the plurality of terminal devices includes the steps of setting in a time axis direction a plurality of time slots, each time slot having a plurality of channels in a path multiplex direction, allocating a channel of an empty time slot in the time axis direction to a terminal device newly requesting connection, and allocating an empty channel in the path multiplex direction to the terminal device newly requesting connection after there is no empty time slot in the time axis direction.

According to an additional aspect of the present invention, the method of allocating to a plurality of terminal devices channels for multiple connection to a base station respectively in response to connection requests from the plurality of terminal devices includes the steps of setting in a time axis direction a plurality of time slots, each time slot having a plurality of channels in a path multiplex direction, allocating an empty channel in the path multiplex direction to a terminal device newly requesting connection, and allocating a channel of an empty time slot in the time axis direction to the terminal device newly requesting connection after there is no empty channel in the path multiplex direction.

According to still another aspect of the present invention, the method of allocating to a plurality of terminal devices including a terminal device adapted to multiple connection and a terminal device not adapted to multiple connection channels for connection to a base station respectively in response to connection requests from the plurality of terminal devices includes the steps of setting in a time axis direction a plurality of time slots, each time slot having a plurality of channels in a path multiplex direction, allocating a dedicated time slot to the terminal device not adapted to multiple connection but newly requesting connection, and allocating another time slot to the terminal device adapted to multiple connection and newly requesting connection.

According to a still further aspect of the present invention, the PDMA communication method includes the steps of allocating a plurality of separable channels belonging to the same frequency and the same time slot to one terminal device, and transmitting and receiving data between the terminal device and a base station using the plurality of allocated separable channels.

According to an additional aspect of the present invention, the PDMA communication method includes the steps of transmitting data of a plurality of separable channels belonging to the same frequency and same time slot from a plurality of antennas respectively at one terminal device end, and separating the data of the plurality of channels by an array antenna at a base station end.

According to another aspect of the present invention, the PDMA communication method includes the steps of transmitting data through a plurality of separable channels belonging to the same frequency and the same time slot using a transmission array antenna directional pattern formed using a reception array antenna directional pattern formed at the time of reception from an array antenna at a base station end, and receiving data of the plurality of channels on a plurality of antennas respectively at one terminal device end.

According to yet another aspect of the present invention, the PDMA communication method includes the steps of transmitting data of a plurality of channels belonging to the same frequency and same time slot at a transmission end, and separating data of the plurality of channels by interference cancellers at a reception end.

A main advantage of the present invention is that transmission channels can be allocated to a plurality of users requesting connection without substantially causing signal interference between channels belonging to the same frequency and same time slot.

Another advantage of the present invention is that reasonable operation of a mobile communication system is allowed without disallowing user connection of higher priority even when the channel capacity arrives at its limit.

A further advantage of the present invention is that the user communication speed can be increased by path multiplex.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 46A, 46B, and 46C show arrangements of transmission channel in FDMA, TDMA, and PDMA communication.

DESCRIPTION OF THE PREFERRED EMBODIMENTS

Figure 1:
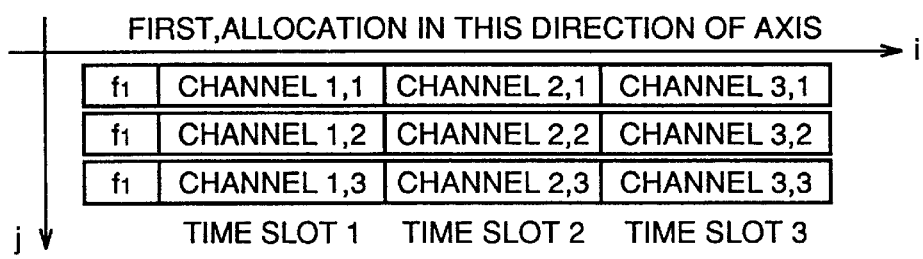
FIGS. 1–6 are diagrams for describing channel allocation procedures according to first to sixth embodiments, respectively, of the present invention.

FIG. 1 is a diagram for describing a channel allocation procedure according to a first embodiment of the present invention. In the present invention, a plurality of channels belonging to the same time and same frequency is generically referred to as "time slot". In the embodiment of FIG. 1, three time slots 1–3 are shown. The area used by each user is referred to as "channel" when a plurality of users that can be separated in respective incoming directions are communicating in the same time slot. In the embodiment of FIG. 1, a total of nine channels are shown. According to the first embodiment of the present invention, a channel in each empty time slot is allocated to a new user sequentially in the direction of i (time direction). When there are no more empty slots, a channel is allocated in the direction of j (or change the channel in the j direction) to initiate path multiplex.

Figure 2:
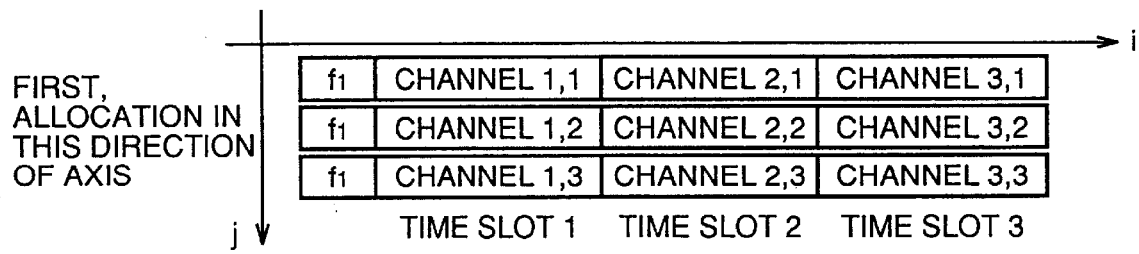

FIG. 2 is a diagram for describing a channel allocation procedure according to a second embodiment of the present invention. In the second embodiment, a channel is allocated sequentially in the j direction to fill up the first time slot 1 with path multiplex. When path multiplex is no longer available in the first time slot 1, a channel is allocated sequentially in the j direction at the next time slot 2.

Figure 3:
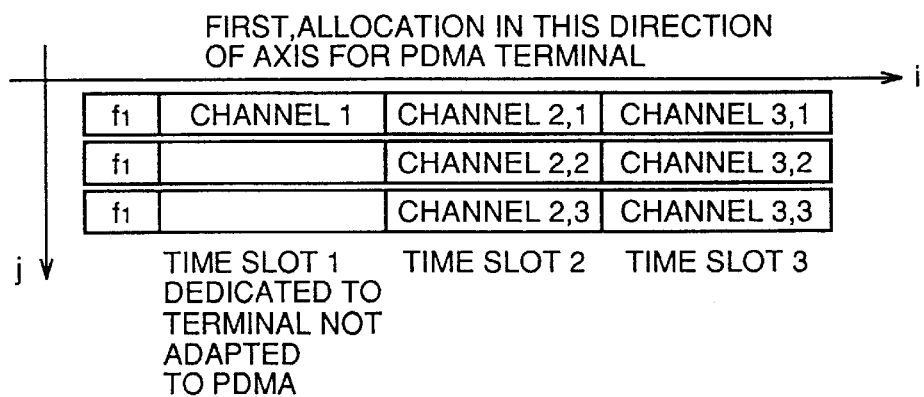

FIG. 3 is a diagram for describing a channel allocation procedure according to a third embodiment of the present invention. In the third embodiment, a particular time slot (for example, time slot 1) is reserved and dedicated to a terminal device that is not adapted to the PDMA protocol. This particular time slot is not adapted to the PDMA protocol. Therefore, only one user can be connected to this one time slot.

In the case where the terminal device requesting connection is adapted to the PDMA, a channel in each empty time slot for the PDMA is allocated sequentially in the i direction. When there is no more empty slot for the PDMA, a channel is allocated in the j direction to initiate path multiplex. When the terminal device requesting connection is not adapted to PDMA, the slot dedicated to a terminal not adapted to PDMA is allocated.

Figure 4:
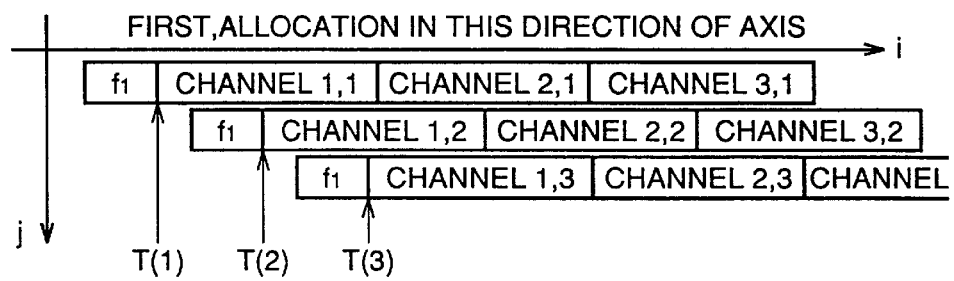

FIG. 4 is a diagram for describing a channel allocation procedure according to a fourth embodiment of the present invention. In the fourth embodiment of FIG. 4, a channel in each empty slot is allocated sequentially in the i direction (time direction) to a new user as in FIG. 1. When there are no more empty slots, a channel is allocated in the j direction. In the present embodiment, the time slot connection timing in the allocation process in the j direction is shifted in the i direction (T(1)→T(2)→T(3)). By shifting the time slots in time, identification of each time slot is facilitated to promote separation of a path.

Figure 5:
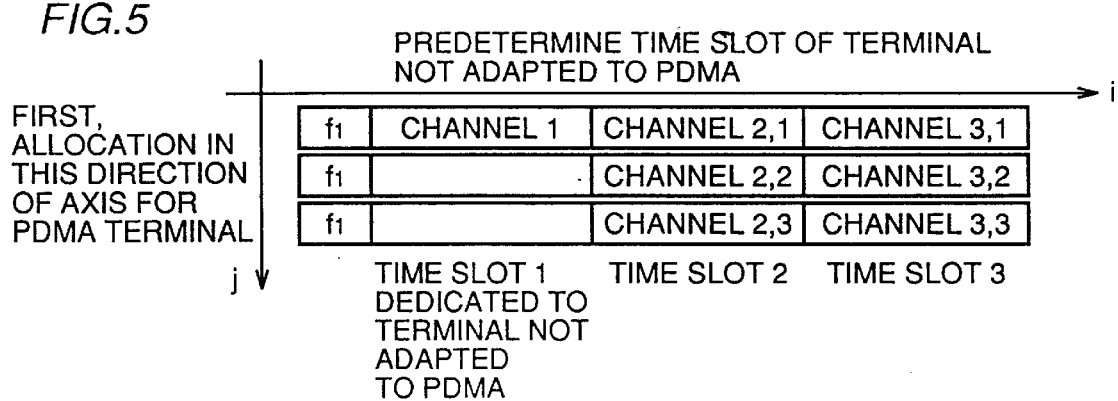

FIG. 5 is a diagram for describing a channel allocation procedure according to a fifth embodiment of the present invention. In the fifth embodiment of FIG. 5, a particular time slot (for example, time slot 1) is reserved and dedicated to a terminal device is not adapted to the PDMA protocol, as in FIG. 3. Since this time slot is not adapted to the PDMA protocol, only one user can be connected to one time slot. If the terminal device requesting connection is adapted to the PDMA, a channel is allocated sequentially in the j direction. The first time slot 2 is filled up by the path multiplex. When path multiplex can no longer be executed, a channel is allocated in the i direction, i.e., in the next time slot 3. If the terminal device requesting connection is not adapted to the PDMA, the dedicated time slot for the PDMA-non-adapted terminal is allocated.

Figure 6:
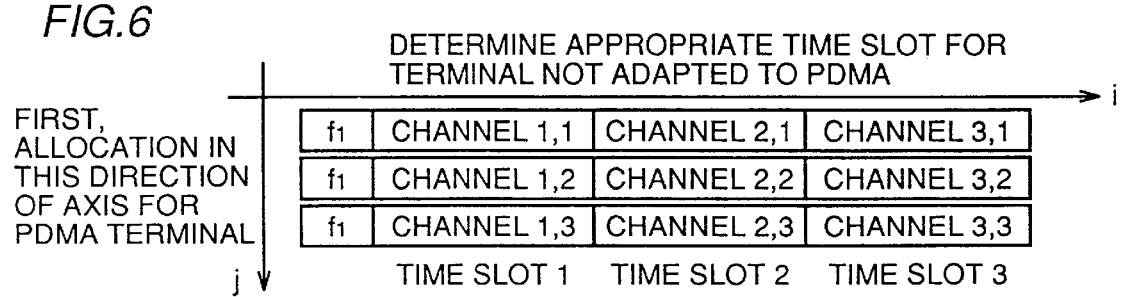

FIG. 6 is a diagram for describing a channel allocation procedure according to a sixth embodiment of the present invention. In the previous embodiments of FIGS. 3 and 5, a dedicated time slot (time slot 1) is allocated to a terminal device that is not adapted to the PDMA. In the present embodiment of FIG. 6, a time slot is appropriately determined with respect to a terminal device that is not adapted to the PDMA. More specifically, when there is a connection request, determination is made whether that terminal device is adapted to the PDMA or not. When that terminal device is not adapted to the PDMA, an appropriate empty time slot is determined as the channel for the terminal device that is not adapted to the PDMA. When the terminal device requesting connection is adapted to the PDMA, connection, if possible, is established at the already-allocated PDMA time slot. If connection cannot be established, another empty time slot is allocated to the PDMA terminal for connection.

Figure 7:
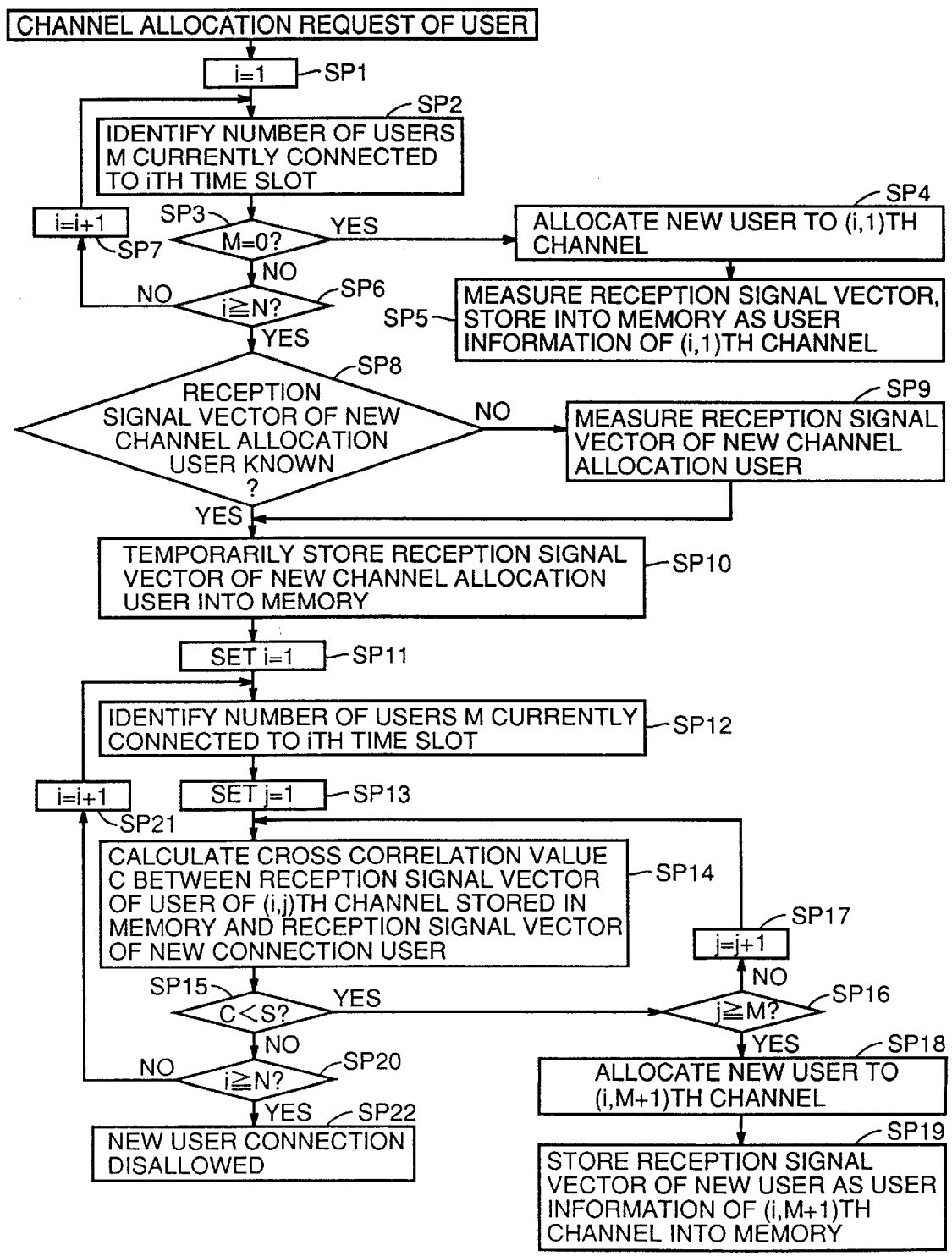
FIG. 7 is a flowchart for describing an operation of the first embodiment of FIG. 1.

FIG. 7 is a flowchart for describing a specific operation of channel allocation according to the first embodiment of FIG. 1. The program according to this flowchart is executed by channel allocation standard calculator 121 shown in FIG. 47.

When channel allocation is requested from a new user in the flowchart of FIG. 7, i=1 is set in the i direction (time direction) of FIG. 1 at step (labeled SP in drawing) SP1. At step SP2, the number of users M connected to the first time slot 1 is identified. At step SP3, determination is made whether the number of currently-connecting users M is 0 or not.

When the value M of time slot 1 is 0, determination can be made that channel (1, 1) shown in FIG. 1 is an empty channel. At step SP4, the current new user is allocated to that channel (1, 1). This user will establish communication thereafter through channel (1, 1) as the transmission channel. At step SP5, the reception signal vector of the signal received from that user of channel (1, 1) is measured and stored in a memory not shown as user information. The reception signal vector measurement method will be described afterwards.

When determination is made that the number of the currently-connected users M of time slot 1 is not 0 at step SP3, it is appreciated that at least channel (1,1) has already been allocated for transmission with another user. Therefore, the possibility of allocation at channel (2, 1) of the next time slot 2 must be identified.

At step SP6, determination is made whether i=1 set at step SP1 is greater than the number of time slots N that is determined in advance with respect to one frequency. N is generally set to "3" in PHS (Personal Handy Phone System), for example. It is assumed that in respective embodiments of the present invention N=3 is set.

Since i (=1) is smaller than N (=3), i is incremented by 1 at step SP7 to result in i=2. The number of users M currently connected to the second time slot 2 is checked at step SP2. Then, determination is made whether value M is 0 or not at step SP3.

It is appreciated that the channel (2, 1) shown in FIG. 1 is an empty channel when M of time slot 2 is 0. At step SP4, the new user is allocated to that channel (2, 1). This user effects communication thereafter through channel (2, 1) as the transmission channel. At step SP5, the reception signal vector from that user of channel (2, 1) is measured and stored in a memory as user information.

When the number of users currently connected in time slot 2 is not 0 at step SP3, it is appreciated that at least channel (2, 1) has already been allocated for transmission with another user. Therefore, the possibility of allocation of channel (3, 1) of the next time slot 3 must be checked.

Thus, steps SP2–SP7 are repeated thereafter. When user number M of the i-th time slot i in the i direction is 0, that user is allocated with channel (i, 1) of that time slot (SP4). Then, the reception signal vector of that user is measured and stored in a memory (SP5).

When an empty slot is not found even when arriving at the Nth (=3) time slot N, i.e., when the channel (N, 1) of time slot N is not an empty channel, determination is made of i=N at step SP6. Then, the program proceeds to step SP8.

At step SP8, determination is made whether the reception signal vector of the user that is currently requesting allocation is already known or not. More specifically, when determination is made that the user currently requesting allocation is a user that has already been allocated with a channel, the reception signal vector thereof has been already measured and stored at the time of the previous channel connection. Therefore, the reception signal vector is already known. If the user currently requesting allocation is identified as a user requesting allocation to a channel for the first time, the reception signal vector is naturally not known. Therefore, the program proceeds to step SP9 to have the reception signal vector thereof measured.

The already-known reception signal vector or the reception signal vector newly obtained at step SP9 of a user that is currently requesting allocation is temporarily stored in the memory at step SP10 for a subsequent process.

When determination is made that there is no empty time slot in the i direction at step SP6 in the first embodiment, channel allocation in the j direction is effected to initiate the so-called path multiplex within the same time slot.

To this end, it is necessary to determine whether interference occurs between the signal of a user already connected to the channel and the signal of a new user requesting allocation in path multiplex.

At step SP11, i=1 is set in the i direction. At step SP12, the number of users M currently connected to the first time slot 1 is identified. At step SP13, j=1 is set in the j direction (path multiplex direction).

At step SP14, the reception signal vector of a channel (i=1, j=1) of the reception signal vectors measured and stored in a memory at step SP5 is read out, and the reception signal vector of the user currently requesting allocation and stored temporarily in the memory at step SP10 is also read out, so that a cross correlation value C between these two read out vectors is calculated.

At step SP15, determination is made whether cross correlation value C calculated at step SP14 is smaller than a standard value S (S is greater than 0 and smaller than 1) that is the determination standard of interference occurrence between signals. When determination is made that cross correlation value C is smaller than standard value S, determination is made that there is substantially no interference between the signal of the existing user of the already connected channel (1, 1) and the signal of the new user requesting allocation.

At step SP16, determination is made whether j=1 set at step SP13 is equal to or greater than the number of users M identified at step SP12. If only channel (1, 1) is currently connected to the existing user at time slot 1, j=M=1 is found. Therefore, the program proceeds to step SP18 where the transmission channel of the new user is allocated to the channel (i=1, M+1=2) of time slot 1 to effect path multiplex within time slot 1. At step SP19, the reception signal vector of that user at this channel (1, 2) is measured and stored in a memory not shown as user information.

When path multiplexing has already been effected in time slot 1 and at least two users are connected, determination is made that j is smaller than M at step SP16. The program proceeds to step SP17 to increment j by 1. Then, the program returns to step SP14 to calculate the cross correlation value C between the reception signal vector of channel (1, 2)

stored in the memory and the reception signal vector of the new user. Then, determination is made that the cross correlation value C is smaller than standard value S at step SP15. When determination is made that j is equal to or greater than M at step SP16, the program proceeds to step SP18 to allocate the transmission channel of (1, M+1) to the new user.

When determination is made that cross correlation value C is not smaller than standard value S at step SP15, determination is made that interference substantially occurs between the signal of the existing user of the already-connected channel in time slot 1 and the signal of the new user requesting allocation. In this case, possibility of path multiplex at the next time slot 2 is to be checked.

At step SP20, determination is made whether i=1 set at step SP11 is equal to or greater than the time slot number N (=3). Since i (=1) is smaller than N (=3), the program proceeds to SP21 to increment i by 1. As a result, i=2 is set. The process of steps SP12–SP15 is repeated as long as cross correlation value C is not smaller than standard value S while incrementing i by 1 until i=N (=3) is identified at step SP20. When a time slot having a cross correlation value C smaller than standard value S is found, a channel (i, M+1) is allocated to the new user at steps SP16–SP18. If a time slot having a cross correlation value C smaller than standard value S is not found until determination is made of i=N (=3) at step SP20, the program proceeds to step SP22 where connection with that new user is disallowed since path multiplex cannot be effected in any time slot.

According to the first embodiment of the present invention, path multiplex is effected in the j direction for a new user as long as there is no substantial interference with the signals of the existing users currently connecting in the same time slot. Thus, an empty time slot is filled up.

In the above embodiment, the reception signal vector is used for calculating the channel allocation standard. The present invention is not limited to use of this vector, and the channel allocation standard can be calculated using the weight vector or a direction of arrival (DOA) of signal in parallel.

Figure 8:
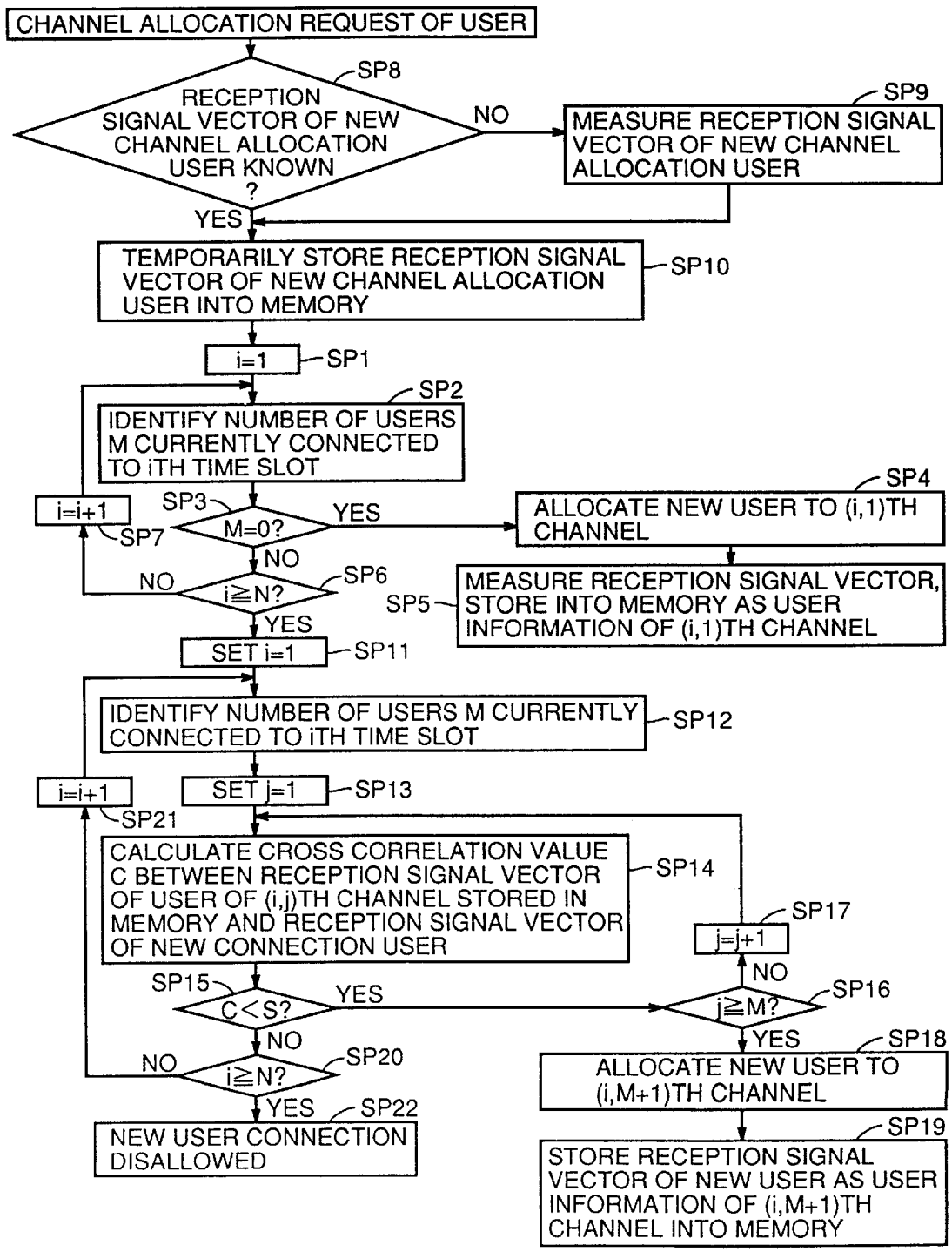
FIGS. 8 and 9 are flowcharts showing modifications of the first embodiment.

FIG. 8 is a flowchart showing a modification of the first embodiment of FIG. 7. Here, the operation of steps SP8–SP10 of FIG. 7 is immediately carried out upon request of channel allocation from a user. The remaining operation of steps of SP1–SP6 and SP11–SP22 is identical to that of FIG. 7. Therefore, description thereof will not be repeated.

Figure 9:
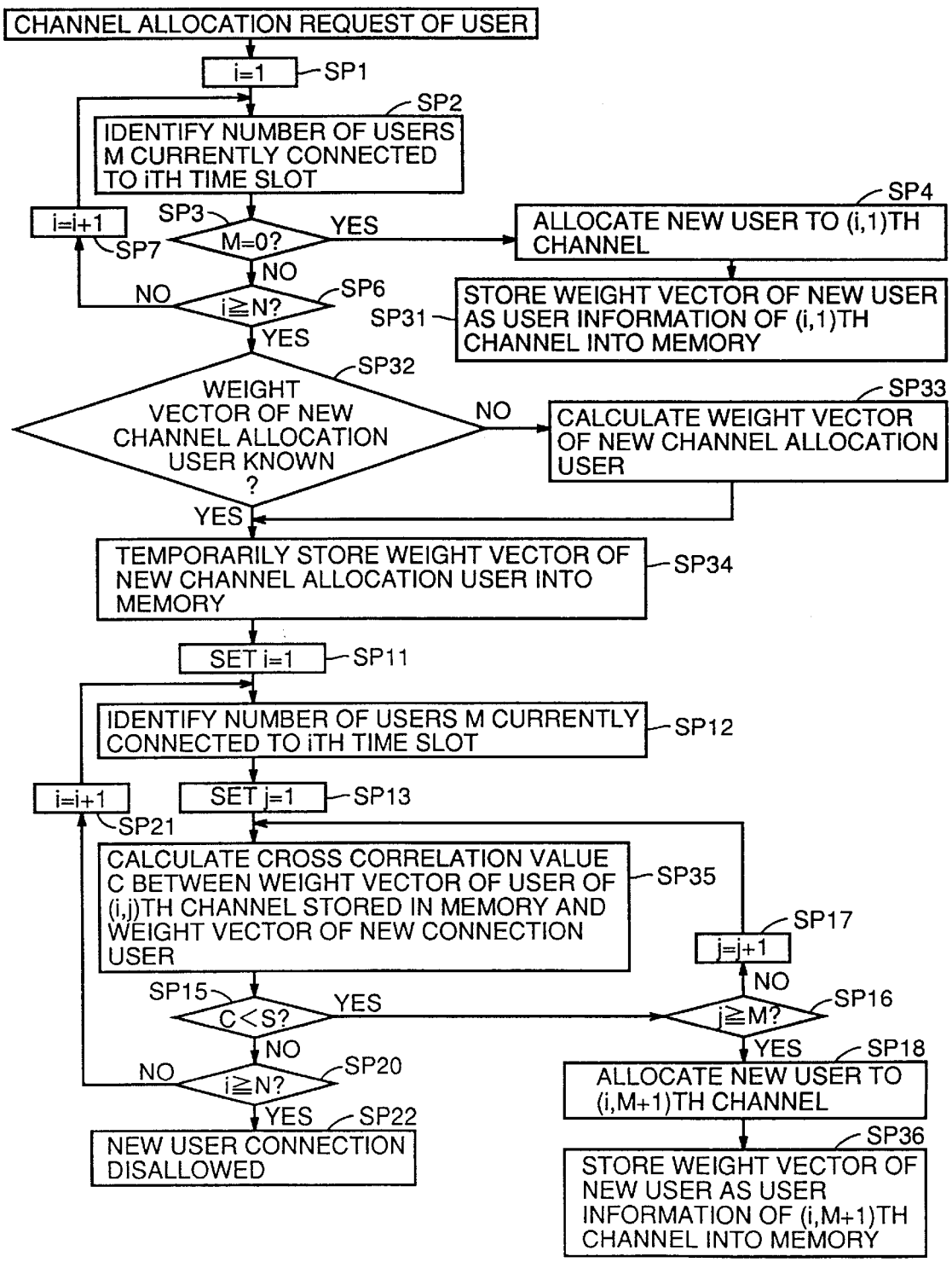

FIG. 9 is a flowchart of another modification of the first embodiment of FIG. 7. Here, a weight vector is used for the channel allocation standard. The reception signal vector at steps SP5, SP8, SP9, SP10, SP14 and SP19 of FIG. 7 is replaced with the weight vector of steps SP31–SP36. The remaining operation is identical to that of FIG. 7. Therefore, description thereof will not be repeated.

Figure 10:
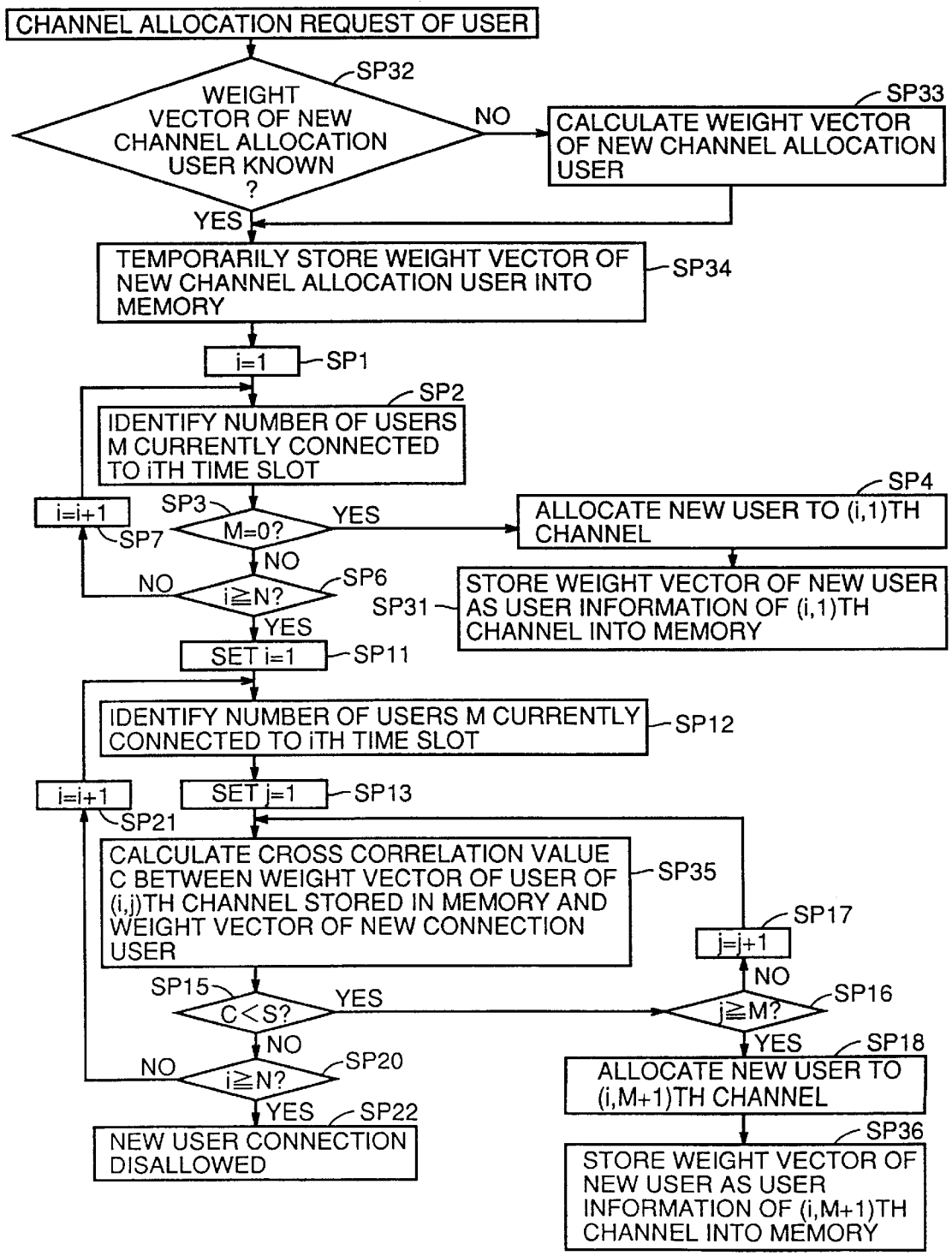
FIG. 10 is a flowchart showing a further modification of the modification of FIG. 9.

FIG. 10 is a flowchart showing still another modification of the embodiment of FIG. 9. Here, similar to the modification of FIG. 8, the operation of steps SP32–SP34 of FIG. 9 is immediately carried out upon channel allocation request from a user. The remaining operation is identical to that of FIG. 9. Therefore, description thereof will not be repeated.

Figure 11:
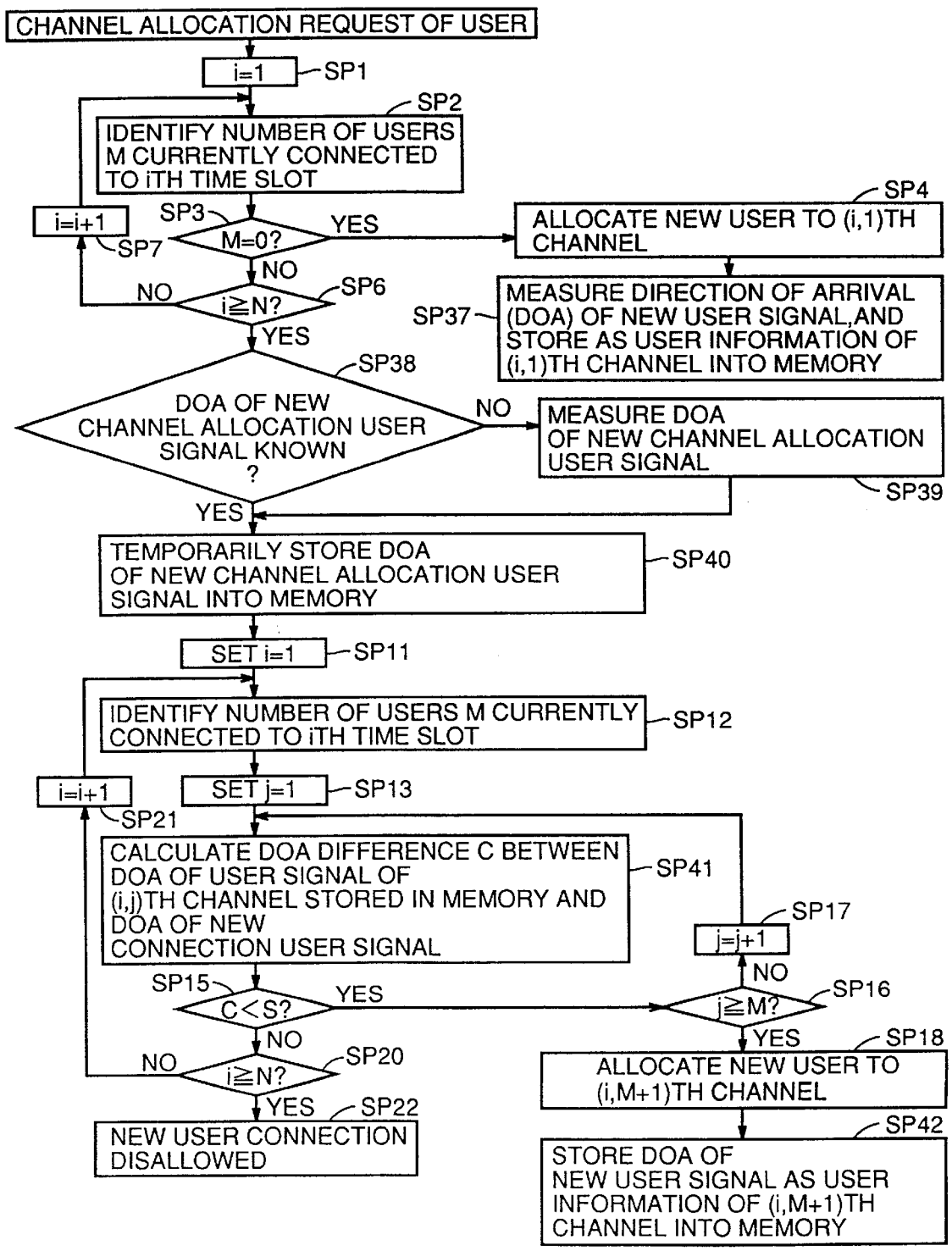
FIG. 11 is a flowchart showing another modification of the first embodiment.

FIG. 11 is a flowchart of a further modification of the first embodiment of FIG. 7. Here, the DOA of a user signal is employed for the channel allocation standard. The standard value that allows the communication channel to new user is set to DOA difference S (S is from 0 to 360 degrees) between DOA of the signal of already connected user and DOA of the new user. The reception signal vector of steps SP5, SP8, SP9, SP10, SP14, and SP19 of FIG. 7 is substituted with the user signal incoming direction of steps SP37–SP42, and the cross correlation value of step SP14 is substituted with the DOA angle difference of step SP41. The remaining operation is identical to that of FIG. 7. Therefore, description thereof will not be repeated.

Figure 12:
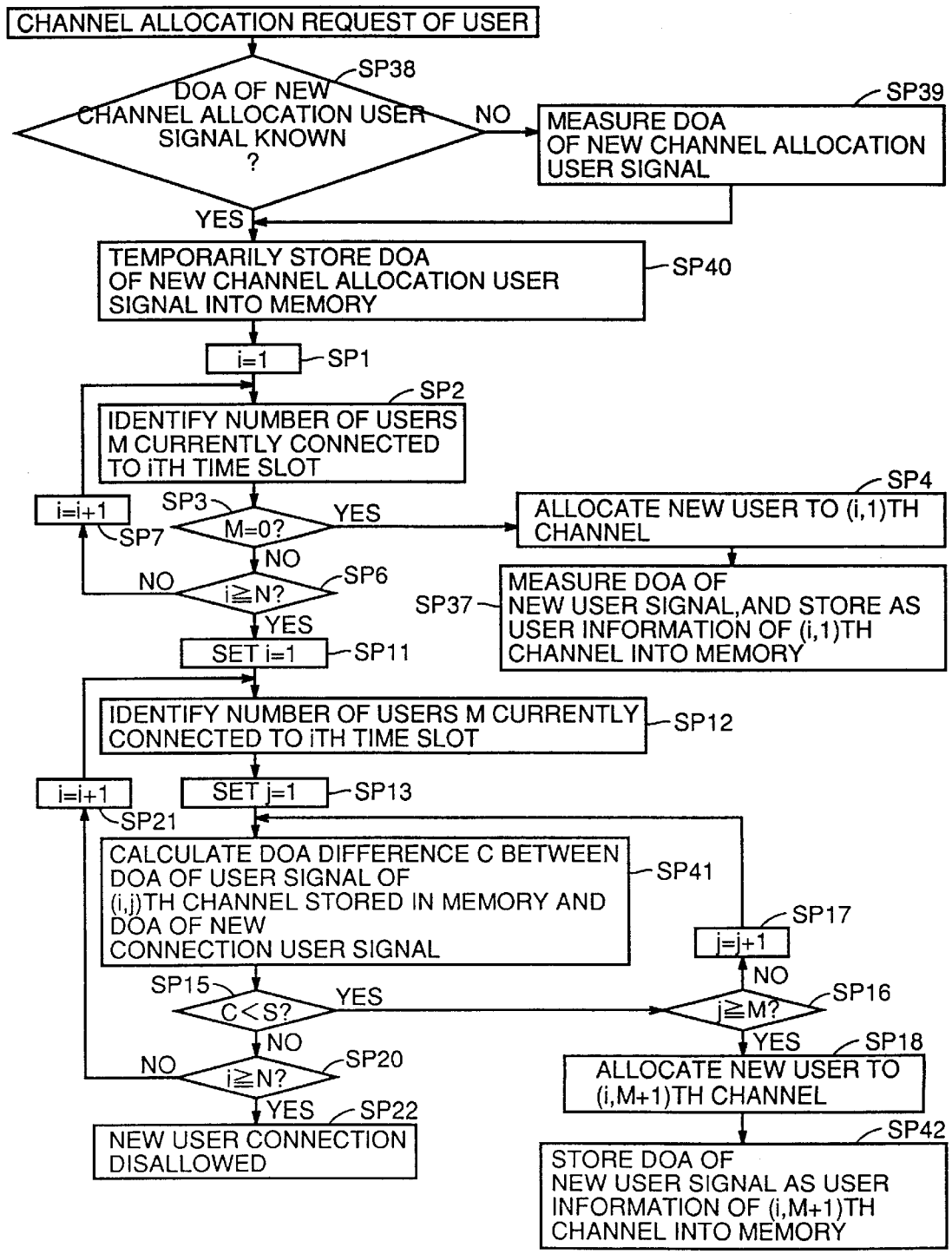
FIG. 12 is a flowchart showing a further modification of the modification of FIG. 11.

FIG. 12 is a flowchart of another modification of the embodiment of FIG. 11. Here, similar to the modification of FIG. 8, the operation of steps SP38–SP40 of FIG. 11 is carried out immediately upon request of channel allocation from a user. The remaining operation is similar to that of FIG. 11. Therefore, description thereof will not be repeated.

Figure 13:
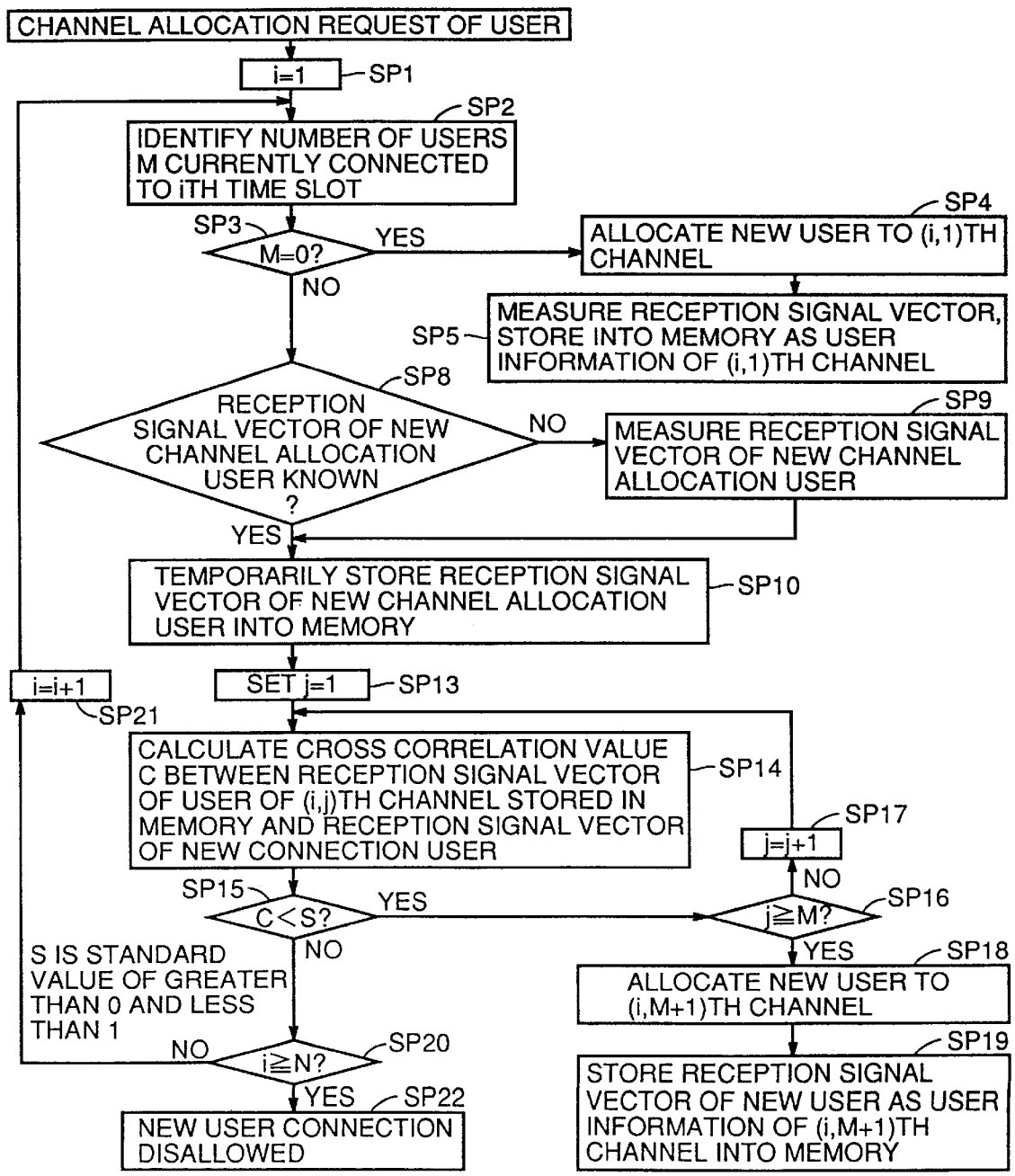
FIG. 13 is a flowchart for describing an operation of the second embodiment of FIG. 2.

FIG. 13 is a flowchart for describing a specific operation of channel allocation according to the second embodiment of FIG. 2. According to the previous flowchart of the first embodiment of FIG. 7, the loop of a process of steps SP2–SP7 is carried out upon a request of channel allocation from a user to make determination whether time slot 1 is empty or not and allocate to the user a channel in the empty time slot. If there is no empty slot, i is incremented by 1 at step SP7 to determine whether the next time slot is empty or not.

In the present second embodiment of FIG. 13, when there is no user that is connected within time slot 1, the empty channel in that time slot is allocated at steps SP2–SP5. If there is already a user that is connected, the reception signal vector of the user that is newly requesting channel allocation is measured at steps SP8–SP10. At SP14, the cross correlation value C between the signal of the existing user in that time slot and the signal of the new user is calculated. At step SP15, determination is made whether interference occurs between the signals of the existing user and the new user. When there is no substantial interference and when there is an empty channel in the time slot, the program proceeds to step S18 to allocate the channel (i, M+1) to the new user. When interference occurs, the program proceeds to step S21 to increment i by 1. The process of steps SP2–SP20 is repeated to carry out the process of channel allocation, i.e. path multiplex, in the next time slot.

Figure 14:
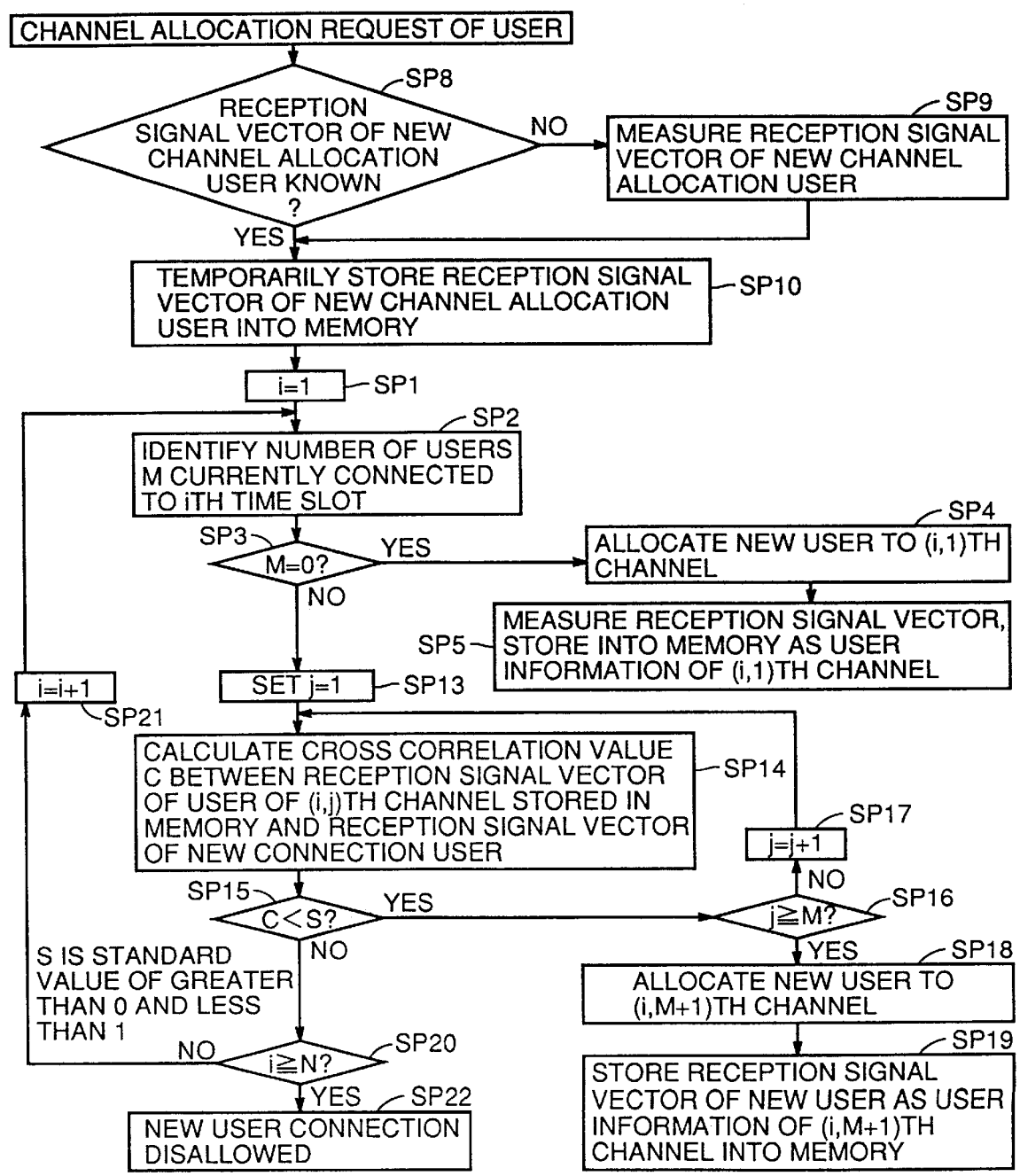
FIG. 14 is a flowchart showing a modification of the second embodiment.

FIG. 14 is a flowchart showing a modification of the second embodiment of FIG. 13. Here, upon a channel allocation request from a user, the operation of steps SP8–SP10 of FIG. 13 is immediately executed. The reception signal vector of the user newly requesting channel allocation is measured and stored in a memory. The remaining operation is similar to that of FIG. 13. Therefore, description thereof will not be repeated.

Figure 15:
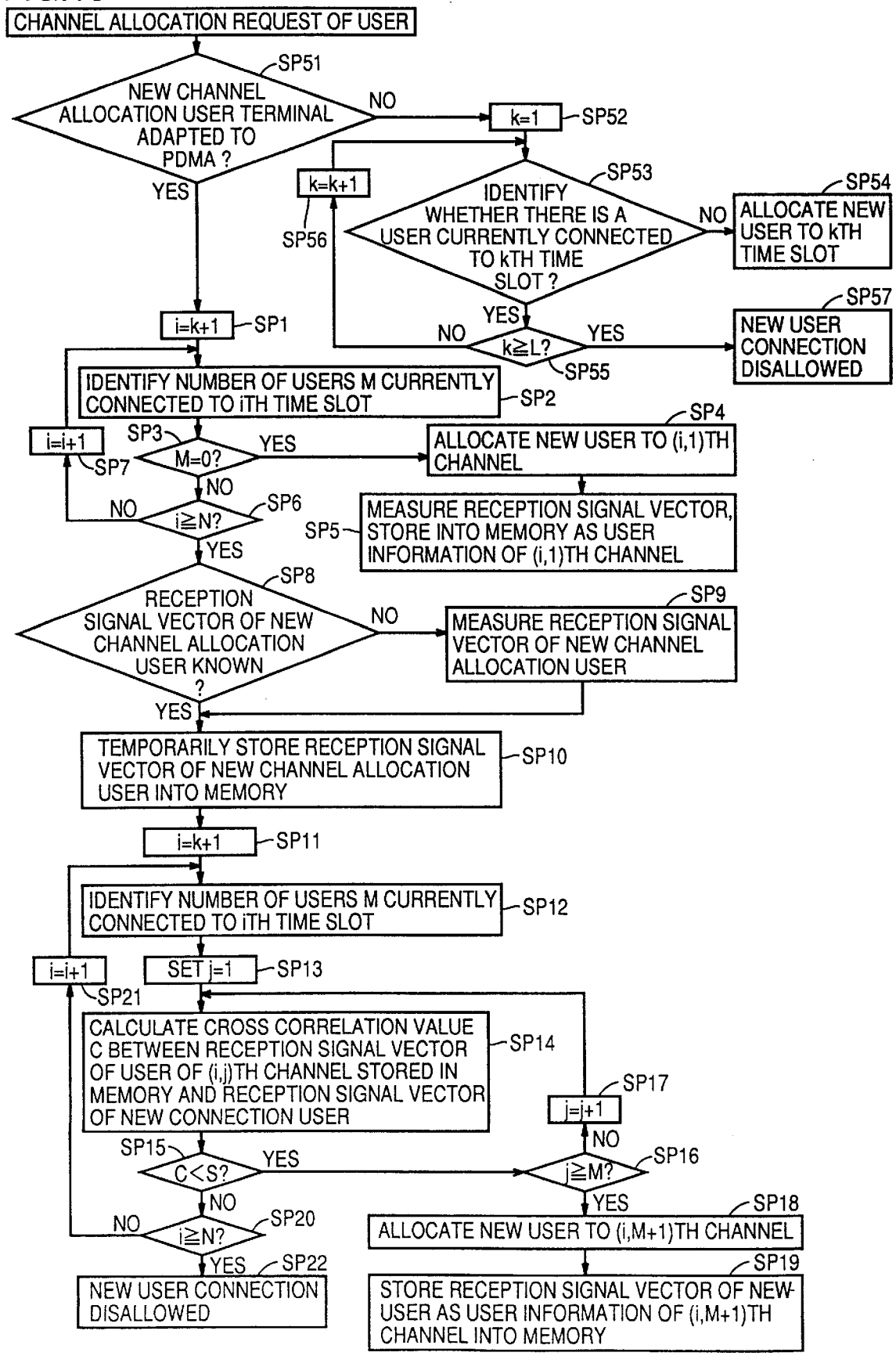
FIG. 15 is a flowchart for describing an operation of the third embodiment of FIG. 3.

FIG. 15 is a flowchart for describing a specific operation of channel allocation according to a third embodiment of FIG. 3. As described with reference to FIG. 3, time slot 1, for example, is reserved as a time slot dedicated to a terminal device that is not adapted to the PDMA protocol in the third embodiment. At step SP51 of FIG. 15, determination is made whether the terminal device of the user that is newly requesting channel allocation is adapted to the PDMA or not. When the terminal device of that user is adapted to the PDMA, i=k+1 is set at step SP1, and channel allocation is carried out in a manner similar to the manner of the first embodiment of FIG. 7. Here, k is the slot number dedicated to the terminal that is not adapted to the PDMA. In a terminal device adapted to the PDMA, channel allocation is carried out skipping the k-th time slot.

When determination-is made that the user terminal device is not adapted to the PDMA at step SP51, the program proceeds to step 52 to set k=1 for setting time slot 1 as the time slot dedicated to the terminal that is not adapted to the PDMA. At step SP53, determination is made whether there is a user currently connected to the k-th time slot. When NO, the program proceeds to step SP54 to allocate the new user to the k-th time slot. If there is a user already connected, the program proceeds to step SP55 to determine whether k≧L is satisfied. Here, L is the number of time slots dedicated to terminals that are not adapted to the PDMA. When k is smaller than L, the program proceeds to step SP56 to increment k by 1. Then, at step SP53 again, determination is made whether there is already a user in the next time slot dedicated to a terminal not adapted to the PDMA. When there is no user, the channel for the new user is allocated at step SP 54. When k≧L is determined at step SP55, the program proceeds to step SP57 to disallow connection of the new user.

Figure 16:
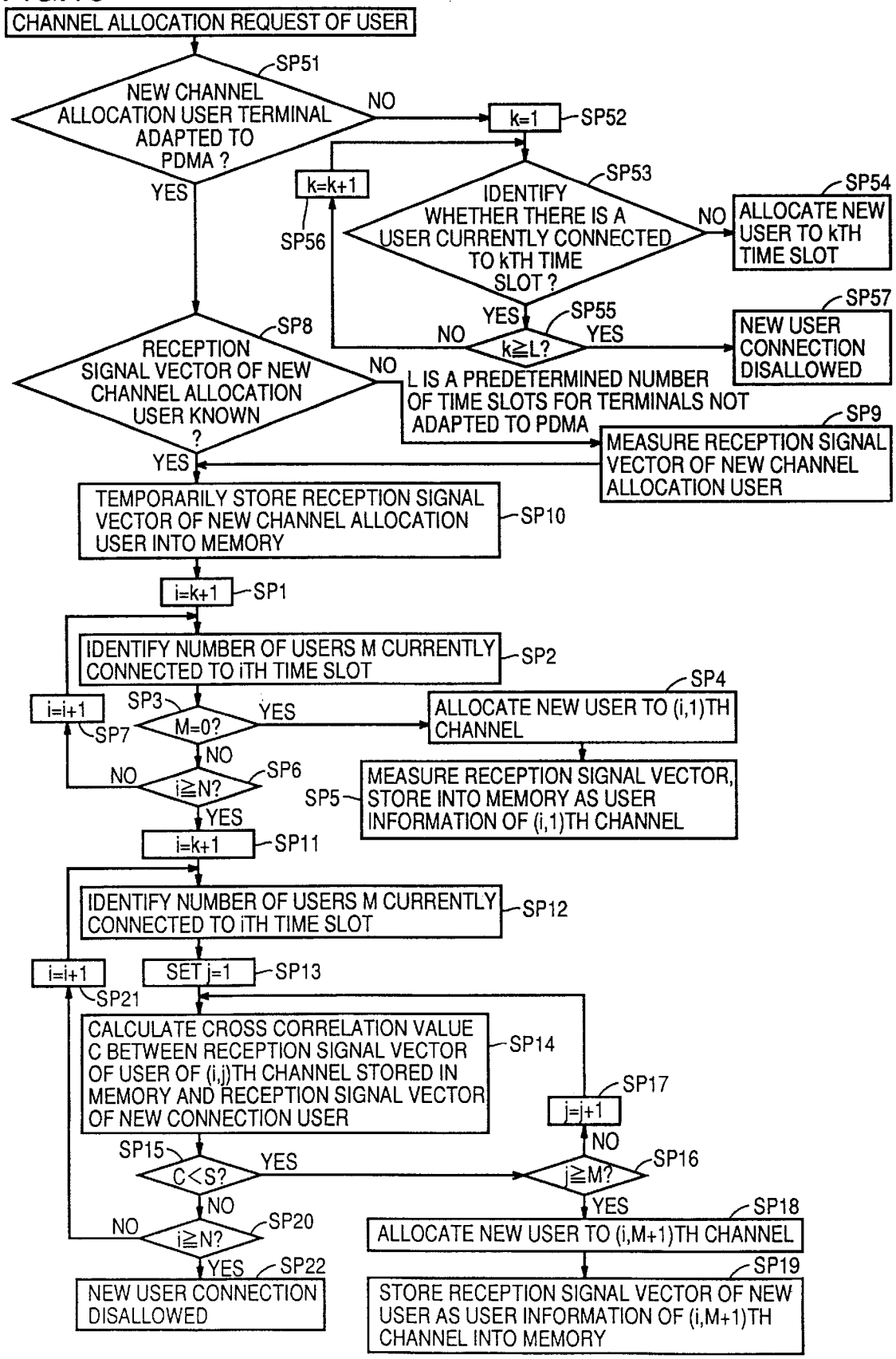
FIG. 16 is a flowchart showing a modification of the third embodiment.

FIG. 16 is a flowchart showing a modification of the third embodiment of FIG. 15. When determination is made that the terminal device is adapted to the PDMA at step SP51, the operation of steps SP8–SP10 is immediately executed to store the reception signal vector of the user newly requesting channel allocation into a memory. Then, the operation of steps SP1–SP7 and SP11–SP22 is executed. The remaining operation is similar to that of FIG. 15. Therefore, description thereof will not be repeated.

Figure 17:
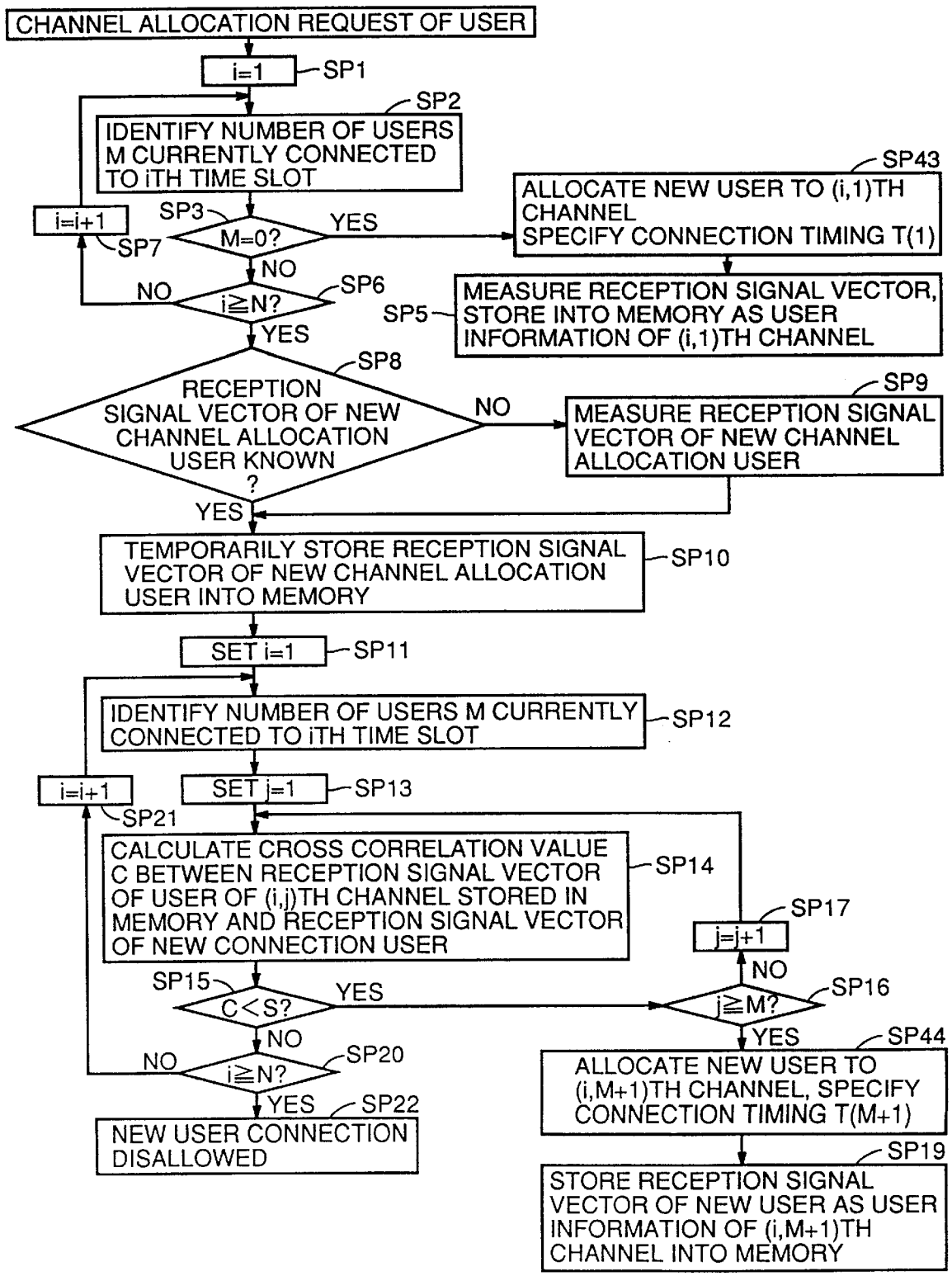
FIG. 17 is a flowchart for describing an operation of the fourth embodiment of FIG. 4.

FIG. 17 is a flowchart for describing a specific operation of channel allocation according to the fourth embodiment of FIG. 4. As described with reference to FIG. 4, the connection timing of a channel is shifted in the i direction (T(1)→T(2)→T(3)) in allocating a channel in the j direction. When allocating a channel (i, 1) to the new user at step SP43 in FIG. 17 (corresponding to step SP4 of FIG. 7), the connection timing T(1) of that channel is specified (for example, standard time T(1)=0 is specified).

When allocating a channel (i, M+1) to the new user at step SP44 of FIG. 17 (corresponding to step SP18 of FIG. 7), the channel connection timing (M+1) is specified. The remaining operation is similar to that of FIG. 7. Therefore, description thereof will not be repeated.

Figure 18:
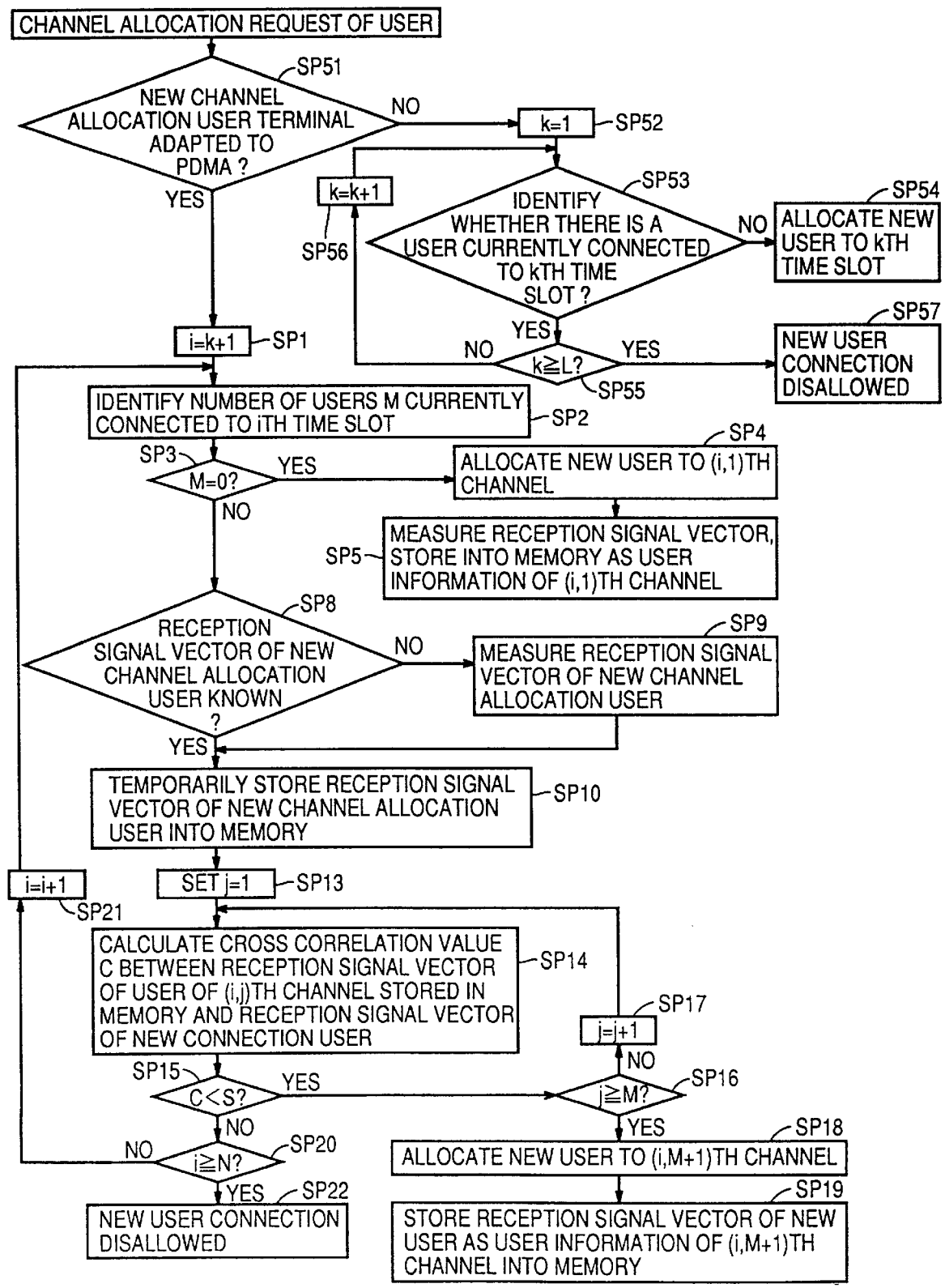
FIG. 18 is a flowchart for describing an operation of the fifth embodiment of FIG. 5.

FIG. 18 is a flowchart for describing a specific operation of channel allocation according to the fifth embodiment of FIG. 5. As described with reference to FIG. 5, when time slot 1 is allocated as the time slot dedicated to the terminal not adapted to the PDMA and when determination is made that the terminal device is not adapted to PDMA at step SP51, the operation of steps SP52–SP57 is executed in a manner similar to that described for the third embodiment of FIG. 15. However, an operation identical to that of the second embodiment of FIG. 13 is executed if the terminal device is adapted to PDMA. More specifically, when the terminal device requesting connection is adapted to the PDMA, a time slot other than the time slot dedicated to the terminal that is not adapted to the PDMA is allocated through path multiplex at step SP18. When path multiplex cannot be effected, determination is made of the empty state of the next time slot at steps SP2 and SP3. The first channel in that time slot is allocated to the new user at step SP4.

Figure 19:
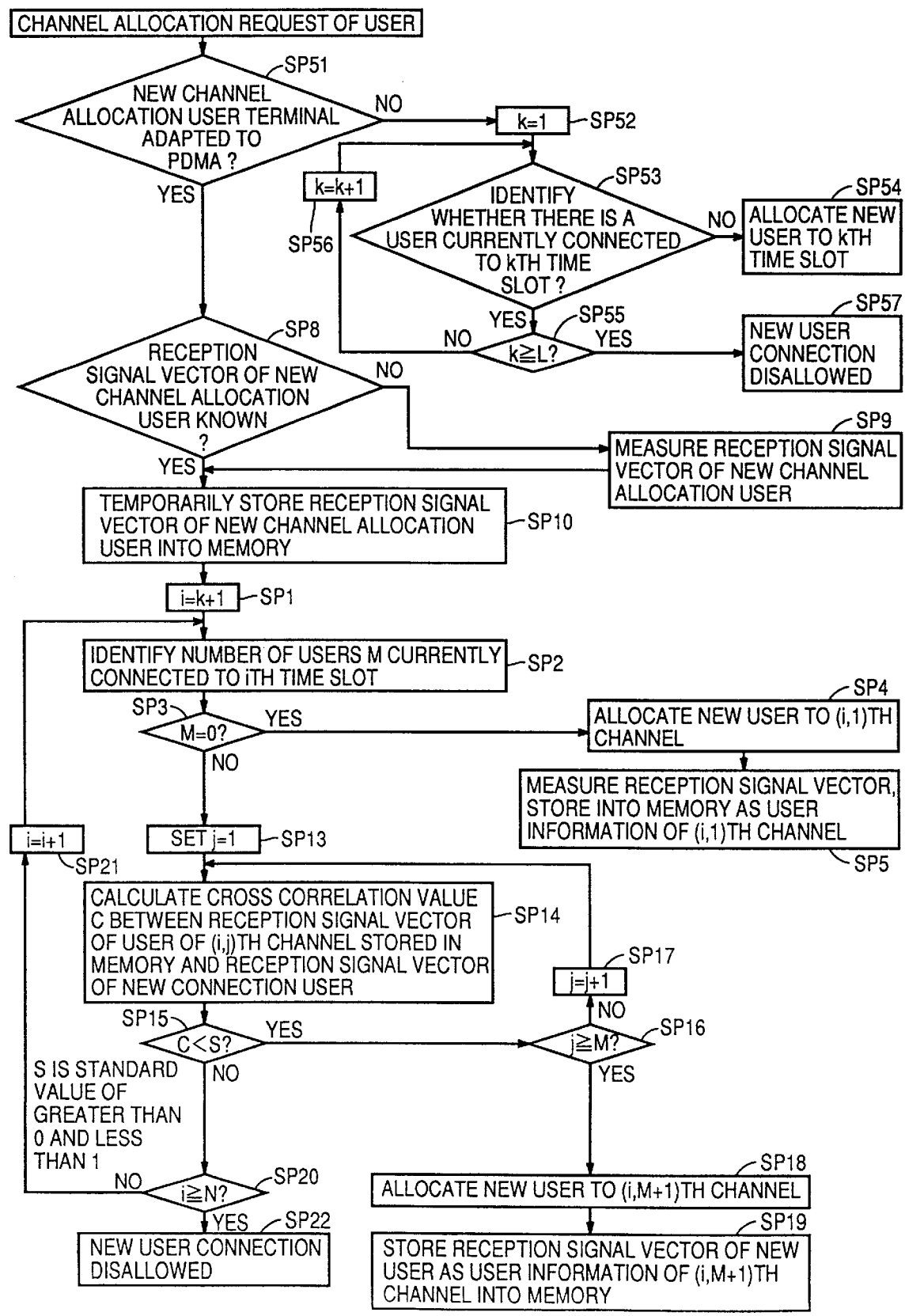
FIG. 19 is a flowchart showing a modification of the fifth embodiment.

FIG. 19 is a flowchart showing a modification of the fifth embodiment of FIG. 18. The process of steps SP8–SP10 of FIG. 18 is carried out after the step of SP51. The operation of the remaining steps of SP1–SP5 and SP13–SP22 is similar to that of FIG. 18. Therefore, description thereof will not be repeated.

Figure 20:
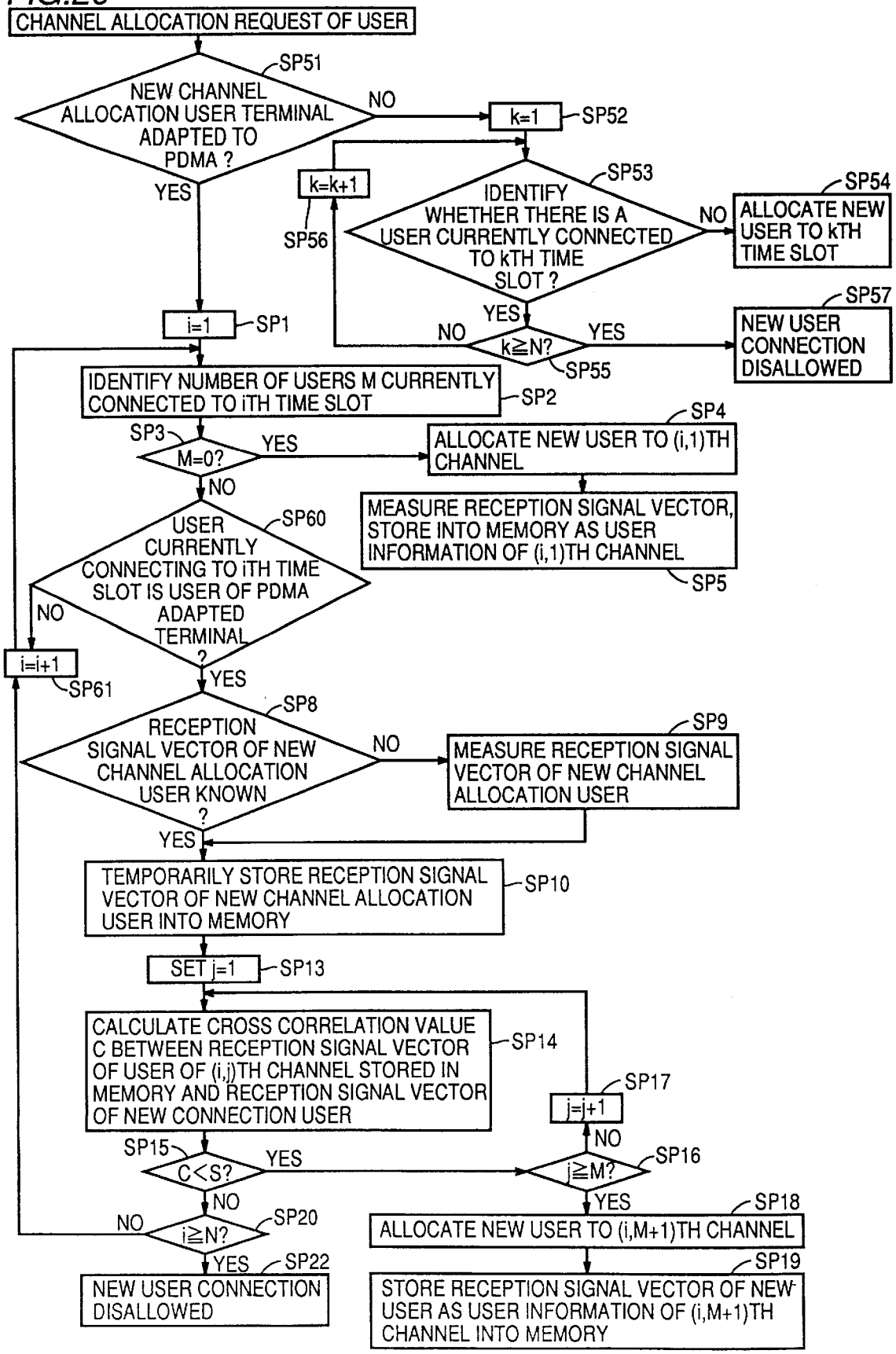
FIG. 20 is a flowchart for describing an operation of the sixth embodiment of FIG. 6.

FIG. 20 is a flowchart for describing a specific operation of channel allocation according to the sixth embodiment of FIG. 6. As described with reference to FIG. 6, a time slot dedicated to the terminal not adapted to the PDMA is appropriately determined without being set in advance. Upon a channel allocation request from a user, determination is made whether the terminal device of that user is not adapted to the PDMA at step SP51. When determination is made that the terminal is not adapted to the PDMA, the operation of step SP52–SP57 is executed to allocate an appropriate time slot.

When determination is made that the user's terminal device is adapted to the PDMA at step SP51, the program proceeds to step SP1 to set i=1. At step SP2, the number of users M connected to the i-th time slot is identified. When the number of users M is not 0 at step SP3, the program proceeds to step SP60 to determine whether the user's terminal device currently connected in that time slot is a terminal device adapted to the PDMA. When determination is made that the user's terminal device is not adapted to the PDMA, the program proceeds to step SP61 to increment i by 1. Then, path multiplex is executed in another time slot.

Figure 21:
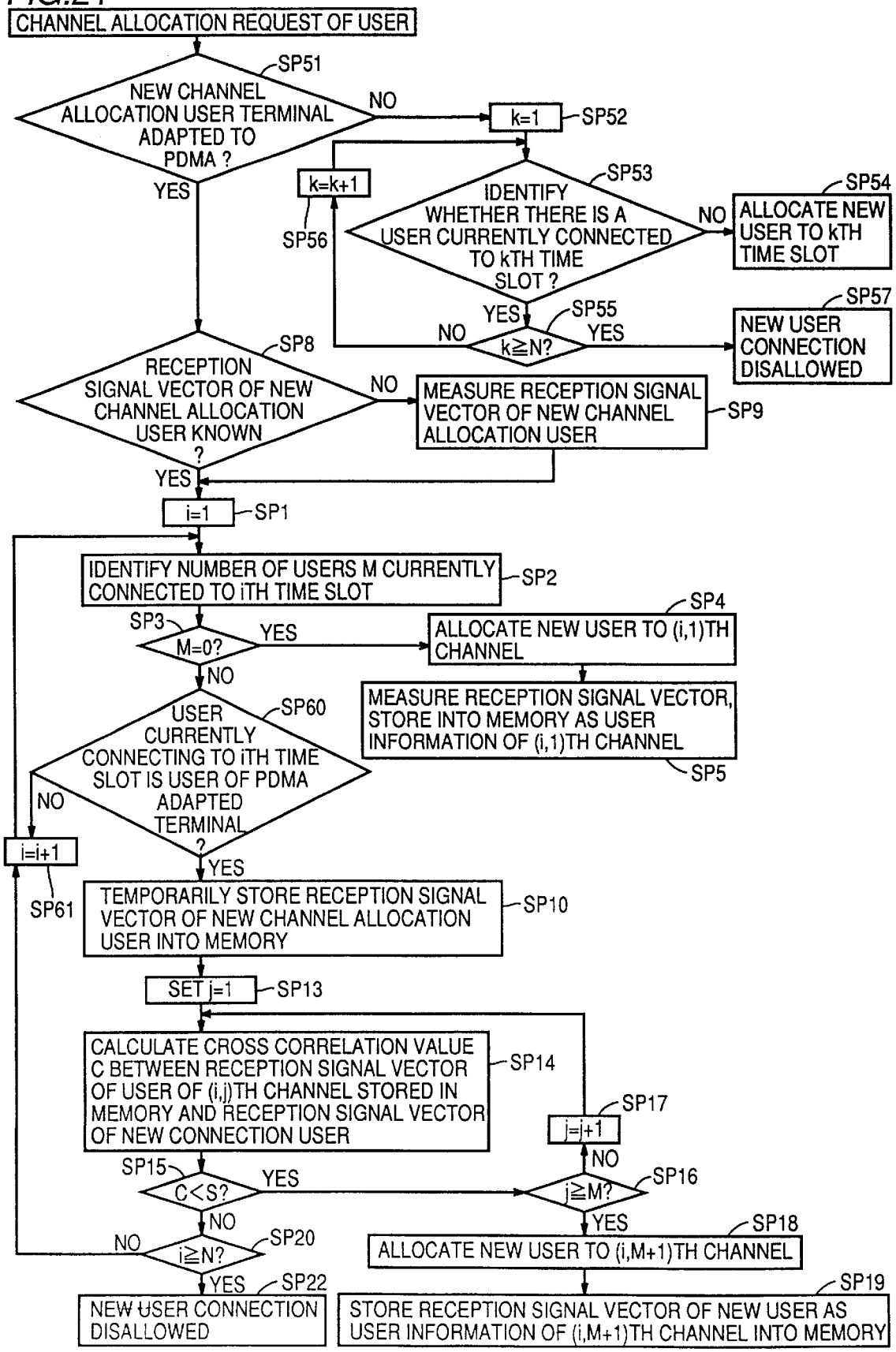
FIG. 21 is a flowchart showing a modification of the sixth embodiment.

FIG. 21 is a flowchart showing a modification of the sixth embodiment of FIG. 20. Here, when determination is made that the user's terminal device is adapted to the PDMA at step SP51, the process of steps SP8 and SP9 shown in FIG. 20 is executed. The operation thereafter of steps SP1 and et seq. is similar to that of FIG. 20. Therefore, description thereof will not be repeated.

The basic transmission channel allocation methods of the first to sixth embodiments have been described above. Various additional embodiments associated with these embodiments will be described hereinafter.

Figure 22:
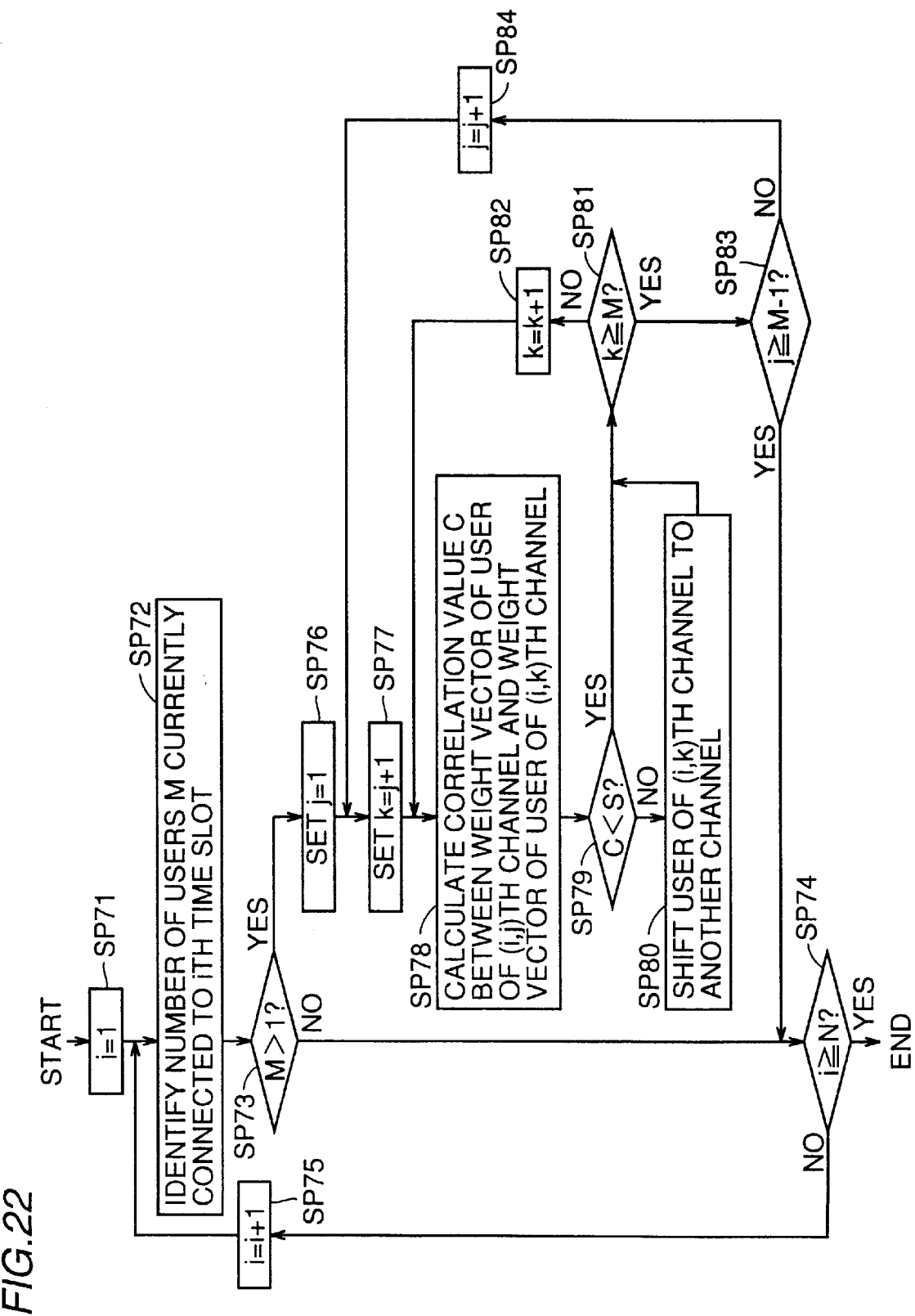
FIG. 22 is a flowchart for describing an operation of a seventh embodiment.

FIG. 22 is a flowchart for describing a specific operation of channel allocation when a user currently establishing a communication is on the move according to a seventh embodiment of the present invention. When the communicating user changes its location to substantially cause interference between the signals of the two users such that the user's signals cannot be separated any longer with the adaptive arrays, the transmission channel of the user is shifted to a time slot in which interference does not substantially occur between the users according to the seventh embodiment.

More specifically, during communication of the users, a mutual interference monitor command is output. At step SP71, i=1 is set in the i direction. At step SP72, the number of users M currently connected to time slot 1 is identified.

When determination is made that at least two users are connected in time slot 1 at step SP73, there is possibility of interference between the signals of the users within time slot 1. Therefore, it is necessary to check whether interference occurs between the signals.

At step SP76, j=1 is set in the j direction. The channel (1, j)=(1, 1) of time slot 1 is specified. Then, at step SP77, k=j+1 =2 is set in the j direction. The channel (1, k)=(1, 2) of time slot 1 is specified.

Then, at step SP78, cross correlation value C of the weight vectors of the user, signals connected to the two channels is calculated at step SP78 to determine whether interference occurs between the two channels (1, 1) and (1, 2) in the same one time slot.

At step SP79, determination is made whether cross correlation value C calculated at step SP78 is smaller than standard value S which is the determination standard of interference occurrence between signals. Determination is made that interference substantially occurs between the signals of the two users connected to the two channels (1, 1) and (1, 2) of the same time slot when cross correlation value C is greater than standard value S. In such case, the program proceeds to the routine of the channel allocation method of any of the first to sixth embodiments in order to allocate another channel to the user that is connected to the channel (1, 2) at step SP80.

When determination is made that the value of k is not equal to or greater than the number of users M in time slot 1 at step SP81, the program proceeds to step SP82 to increment k by 1. At step SP78, cross correlation value C of the weight vectors of the signals of the users connected to channels (1, 1) and (1, 3) is calculated. When determination is made that interference substantially occurs between the signals, channel reallocation is carried out at step SP80.

When determination is made that the value of k arrives at the value of the users M in time slot 1 after repeating the process of steps SP78–SP82, determination is made whether j is equal to or greater than M−1 at step SP83. When j has not reached M−1, the program proceeds to step SP84 to increment j by 1. Then, determination is made whether interference occurs between the signals of channels (1, 2) and (1, k) via steps SP77–SP82. When determination is made that interference occurs between the signals of the two channels, channel reallocation of step SP80 is carried out.

When the above-described process of steps SP77–SP84 is repeated to arrive at the determination that j is equal to or greater than M−1 at step SP83, determination is made of substantial interference between every pair of channels for the at least two users in time slot 1. It is then necessary to determine the possibility of substantial interference in the next time slot 2. Thus, the program proceeds to step SP74.

When determination is made that 2 or more users are not connected in time slot 1 at step SP73, the program proceeds to the next step of determining the possibility of substantial interference at the next time slot 2 since there is not substantial interference of signals between users in time slot 1. The program proceeds to step SP74 to determine whether i=1 set at step SP71 is equal to or greater than the time slot number N. Since i (=1) is smaller than N (=3), the program proceeds to step SP75 to increment the value of i by 1. As a result, i=2 is set. At step SP72, the number of users M currently connected to time slot 2 is identified.

The above-described process of steps SP73–SP84 is repeated thereafter. Occurrence of substantial interference between users is determined in all the N time slots. Upon determination of occurrence of substantial interference, one user has its transmission channel shifted (reallocated).

Figure 23:
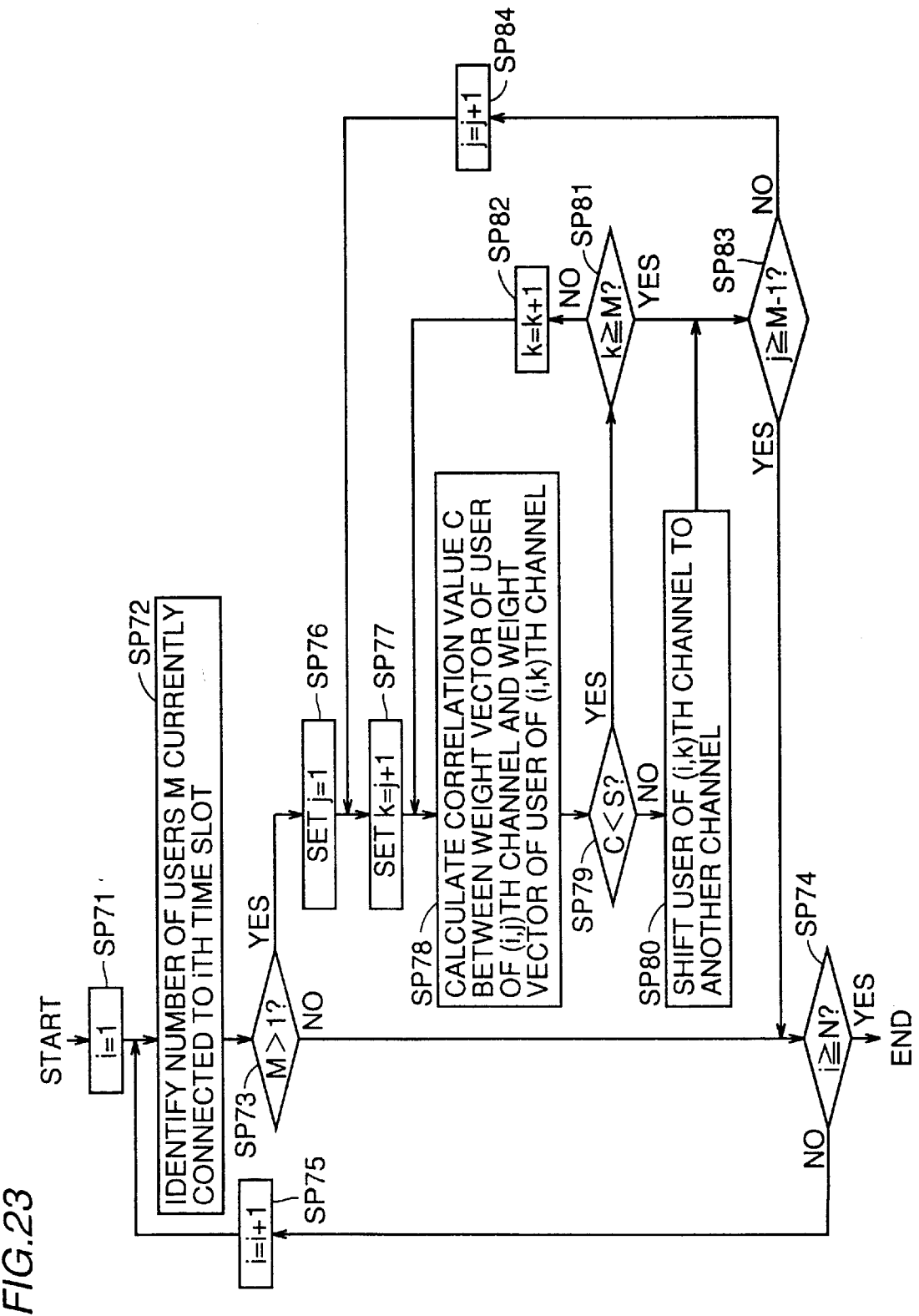
FIGS. 23 and 24 are flowcharts showing modifications of the seventh embodiment.

FIG. 23 is a flowchart showing a modification of the seventh embodiment of FIG. 22. In the previous example of FIG. 22, the user of channel (1, k) of time slot 1 is shifted to another channel at step SP80 and then channel (1, k) is incremented in the j direction while channel (1, j) is fixed at steps SP81 and SP82. In the present example of FIG. 23, the program proceeds to step SP83 and SP84 after shifting the user of channel (1, k) to another channel. At steps SP83 and 84, both the channels of (1, j) and (1, k) of time slot 1 are incremented. The remaining operation is similar to that of FIG. 22. Therefore, description thereof will not be repeated.

Figure 24:
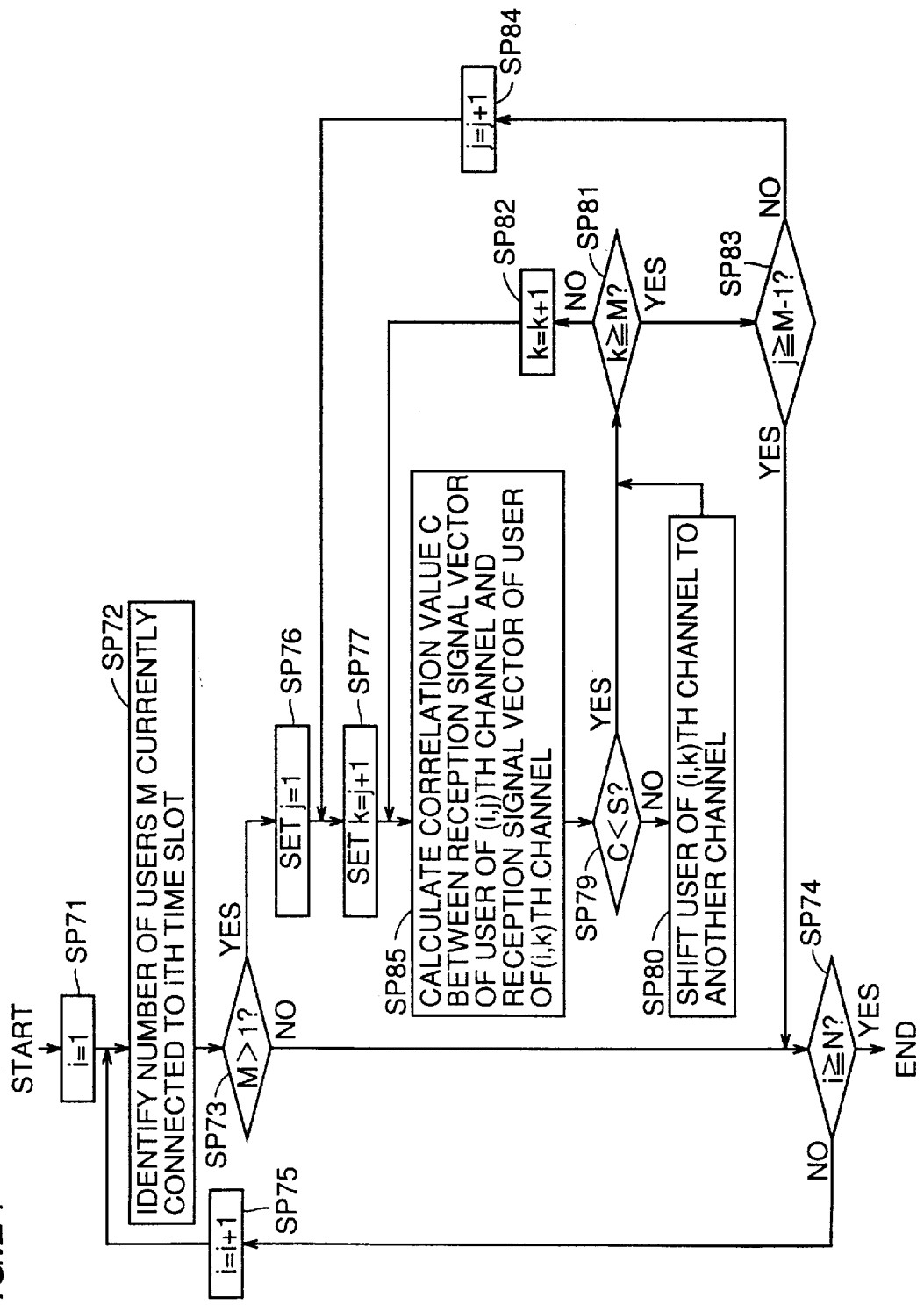

FIG. 24 is a flowchart showing a modification of the seventh embodiment of FIG. 22. In the previous example of FIG. 22, correlation value C of the weight vectors of both user signals is identified to determine whether substantial interference occurs between the user signal of channel (1, j) and the user signal of the channel (1, k) in time slot 1 at step SP78. In the example of FIG. 24, correlation value C of the reception signal vectors of the signals of the two users is identified at step SP85. The remaining operation is similar to that of FIG. 22. Therefore, description thereof is not repeated.

Figure 25:
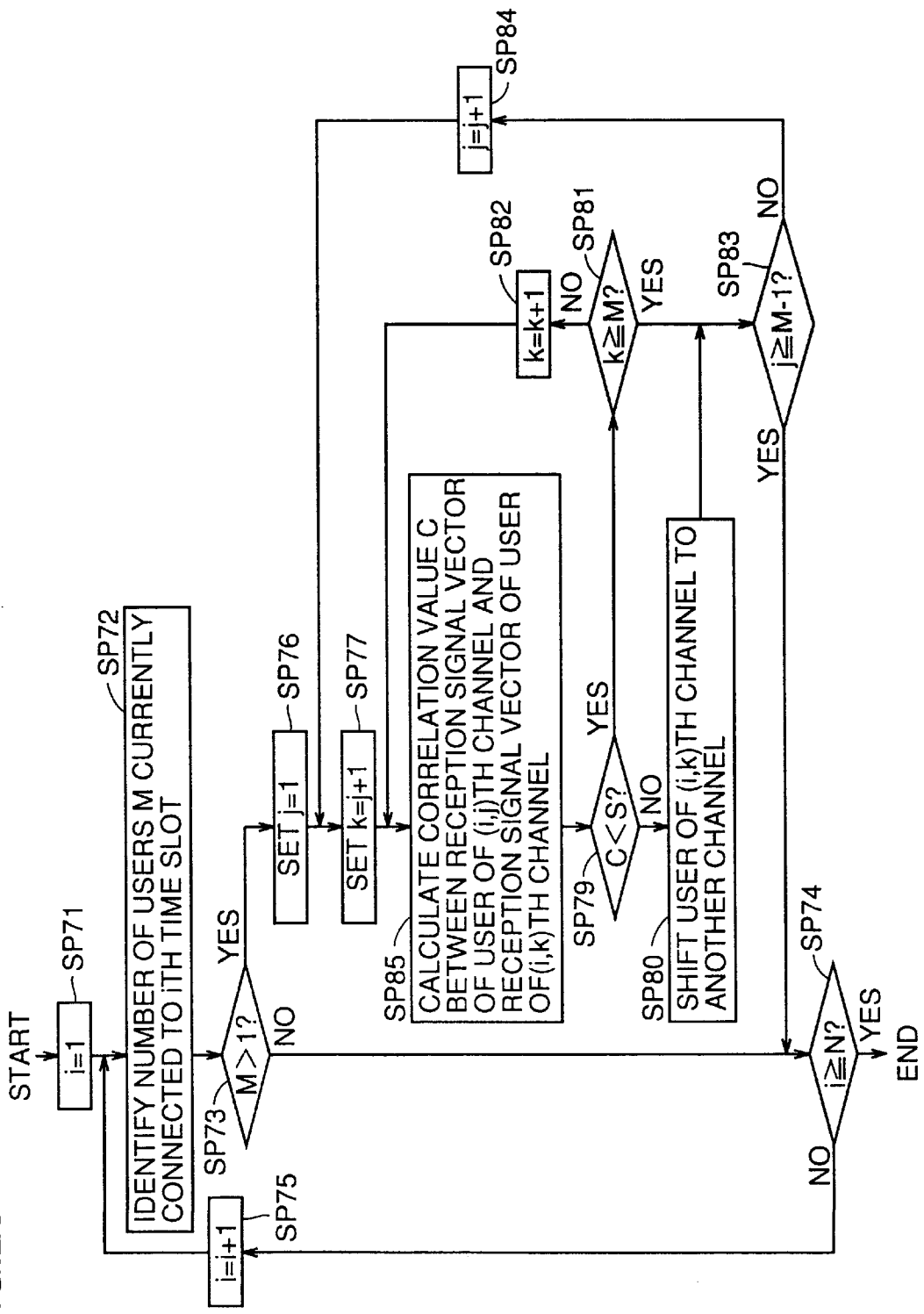
FIG. 25 is a flowchart showing a further modification of the modification of FIG. 23.

FIG. 25 is a modification of the embodiment of FIG. 23. Similar to FIG. 24, correlation value C of the reception signals vectors of the signals of the two users is identified at step SP85.

Figure 26:
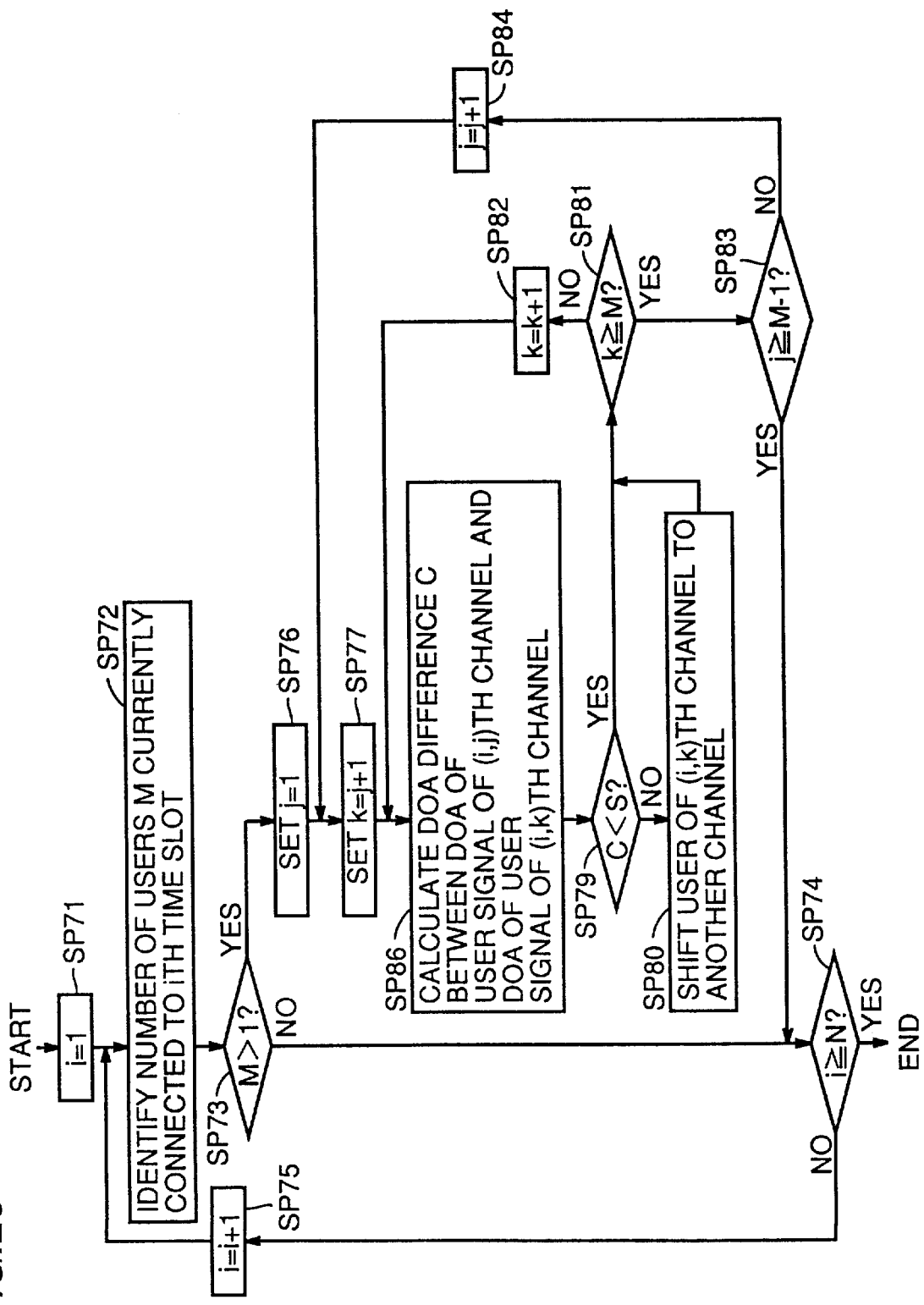
FIG. 26 is a flowchart showing another modification of the seventh embodiment.

FIG. 26 is a flowchart showing a modification of the seventh embodiment of FIG. 22. Here, a DOA difference C in the incoming direction of the signals of the two users is obtained at step SP86.

Figure 27:
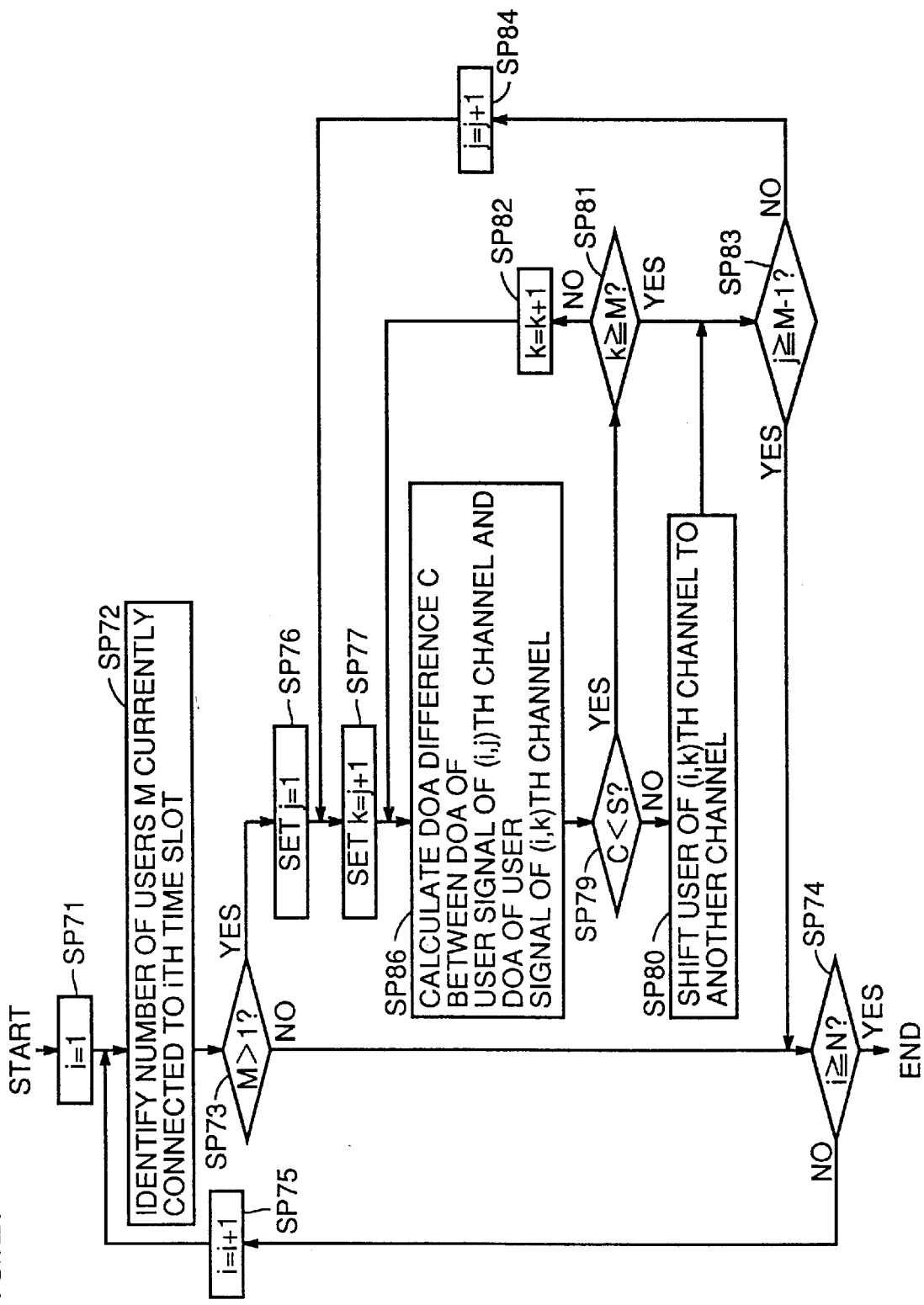
FIG. 27 is a flowchart showing a further modification of the modification of FIG. 23.

FIG. 27 is a flowchart showing a modification of the embodiment of FIG. 23. Here, the DOA difference C in the incoming direction of the signals of both users is obtained at step SP86.

Figure 28:
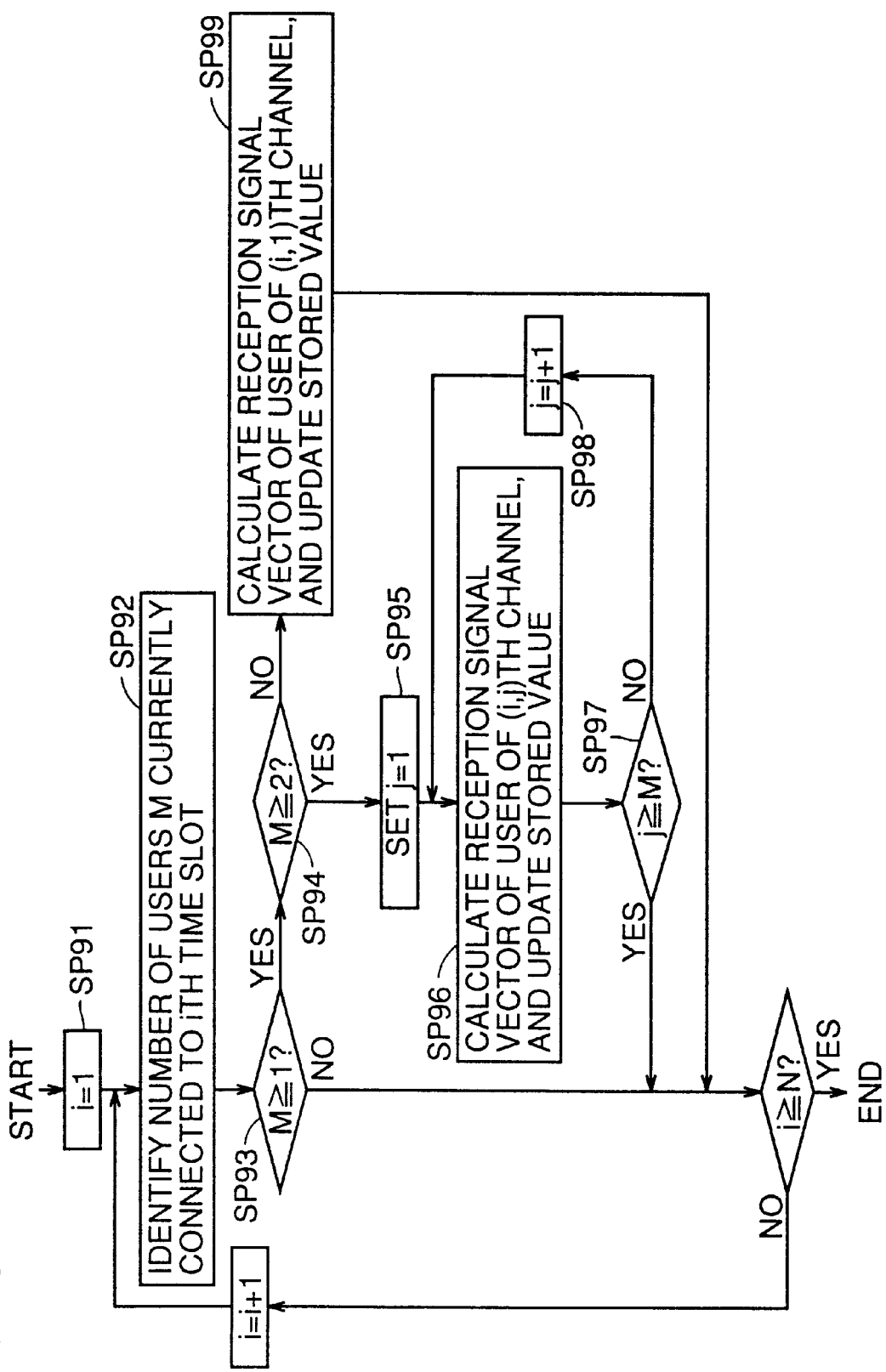
FIGS. 28 and 29 are flowcharts showing an operation of updating a reception signal vector during communication.

FIG. 28 is a flowchart showing an operation of updating the reception signal vector during communication. When a user is moving during communication, the increase/decrease of interference amount between signals of the two users is identified from time to time by measuring the reception signal vectors during communication.

FIG. 28 shows the operation of updating the reception signal vector when there are one or at least two users in one time slot. At step SP91 of FIG. 28, i=1 is set in the i direction to select time slot 1. At step SP92, the number of users M connected to time slot 1 is identified. When determination is made that one or more users are connected to time slot 1 at step SP93, the program proceeds to step SP94 to determine whether there are two or more users. When determination is made that the number of users is less than 2, i.e., when there is one user at step SP94, the program proceeds to step SP99 to calculate the reception signal vector of the user of the first channel (1, 1) in time slot 1. The value stored in the memory is updated with this calculated vector. The reception signal vector corresponding to the case where the number of users M is 1 is correctly calculated using the reception signal vector calculation method applied to the case of M=1 that will be described afterwards with reference to FIGS. 32 and 33.

When the number of users is two or more, the program proceeds to step SP95 to set j=1, so that channel (1, 1) of time slot is set. Then, the program proceeds to step SP96 to calculate the reception signal vector of the user of channel (1, 1) of time slot 1. The value stored in the memory is updated with this calculated reception signal vector. Thus, when the number of users M is two or more, the reception signal vector is properly calculated using the reception signal vector calculation method applied to the case of M=1 or M≧2 that will be described afterwards with reference to FIGS. 30 and 31.

Determination is made at step SP97 whether the channel number j in the j direction is equal to or greater than the number of users M. When NO at step SP97, the program proceeds to step SP98 to increment j by 1. The reception signal vector of the next channel (1, j) is calculated to update the value stored in the memory.

Figure 29:
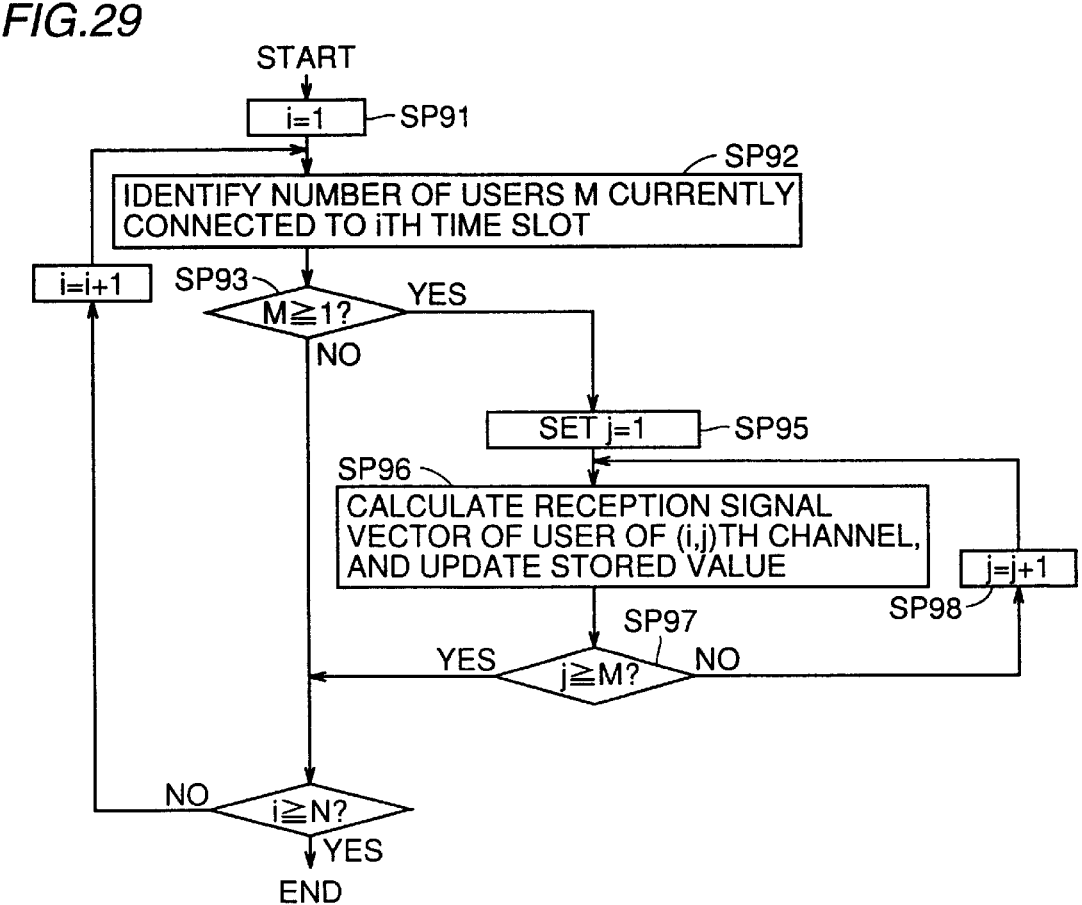
Figure 30:
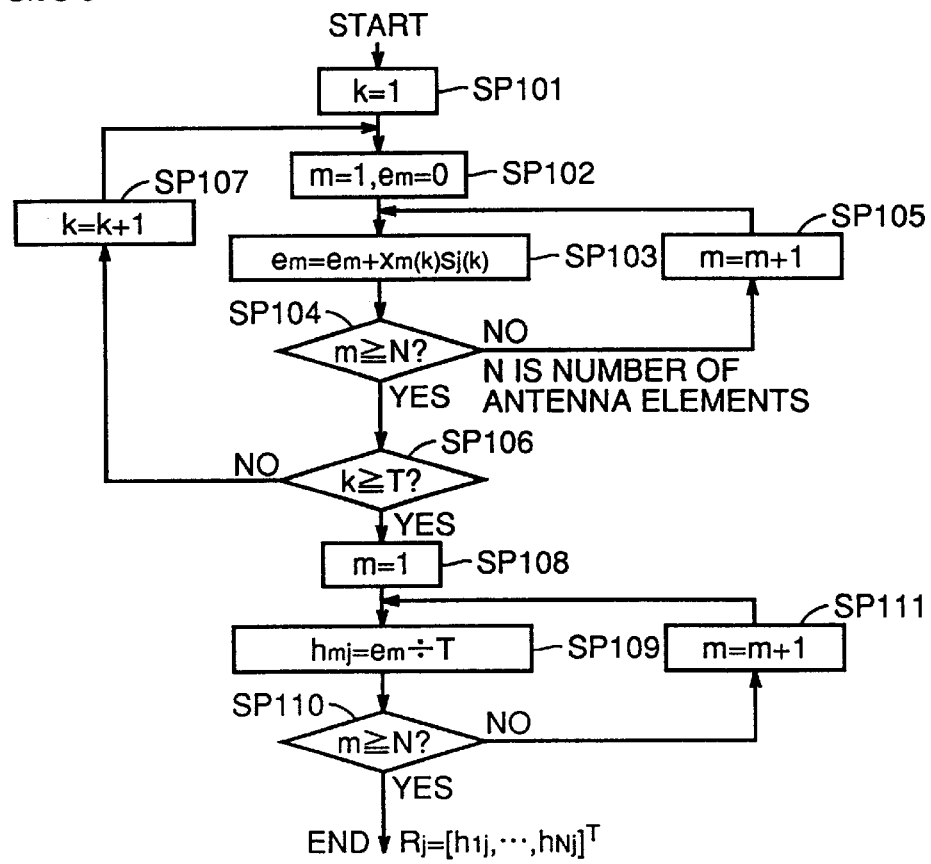
FIG. 30 is a flowchart showing an operation of updating a reception signal vector.
Figure 31:
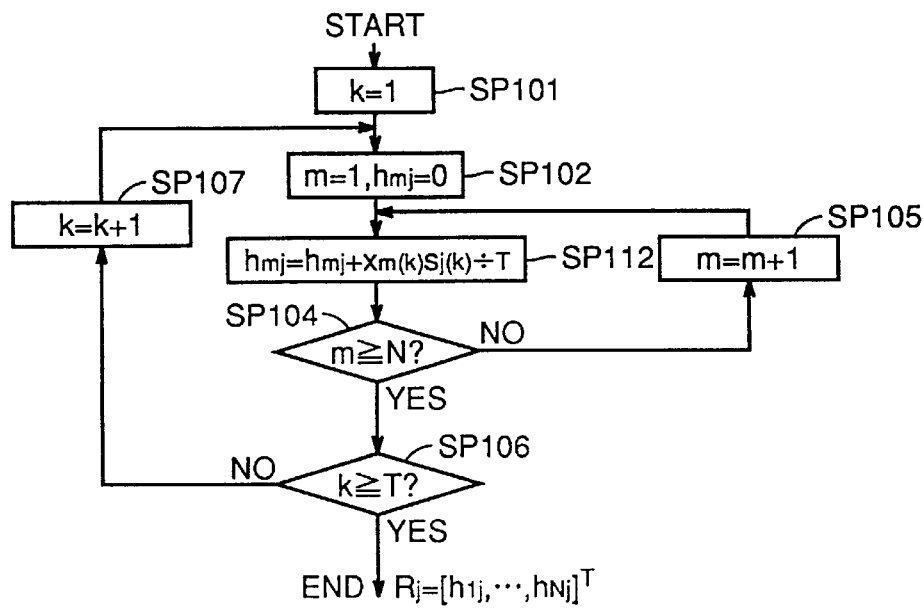
FIG. 31 is a flowchart showing a modification of the embodiment of FIG. 30.

FIG. 29 is a flowchart showing an operation of updating a reception signal vector when the number of users in one time slot is arbitrary. In the program of the previous example of FIG. 28, the process of steps SP94 and SP99 is required since a particular calculation method is employed when there is only one user. In the program of FIG. 29, the calculation method applied to the case of M=1 or M:2 shown in FIGS. 30 and 31 is employed at step SP96. Therefore, the process of steps SP94 and SP99 is absent. The remaining operation is similar to that of FIG. 28.

The method of calculating the reception signal vector of each user when at least two users are connected to one time slot will be described hereinafter. When there are two antenna elements and two users connected to one time slot, the reception signal is represented by the following equation.

$$X(t)=[x_1(t), x_2(t)]^T$$
$$x_1(t)=h_{11}s_1(t)+h_{12}s_2(t)+n_1(t)$$
$$x_2(t)=h_{12}s_1(t)+h_{22}s_2(t)+n_2(t)$$

where $x_i(t)$ is the reception signal of the i-th antenna, $s_i(t)$ is the signal of the i-th user, $n_i(t)$ is the thermal noise of the i-th antenna, $h_{ij}$ is the coefficient of the j-th user signal received on the i-th antenna, and $[\cdot]^T$ represents the transposition of a matrix $[\cdot]$.

In the case where the adaptive array operates favorably, all the $s_i(t)$ is known since the user signal is separated and extracted. By multiplying the reception signal by the known user signal and calculating the ensemble average (time average), the following equation is obtained.

$$E[x_1(t)s_1(t)]=h_{11}E[s_1(t)s_1(t)]+h_{12}E[s_2(t)s_1(t)]+E[n_1(t)s_1(t)]$$

When the average time is sufficient, the first term of $E[s_1(t)s_1(t)]$ at the right side in the above equation becomes 1. As to the second term, $E[s_2(t)s_1(t)]=0$ is obtained since there is no correlation between the signal of user 1 and the signal of user 2. The third term becomes $E[n_1(t)s_1(t)]=0$ since there is no correlation between the signal of user 1 and the noise signal. Therefore, the vector value $h_{11}$ received on the first antenna of the first user can be calculated by the following equation.

$$E[x(t)s_1(t)]=h_{11}$$

By sequentially altering the antenna in a similar manner, vector value $h_{21}$ can be calculated by the following equation.

$$E[x_2(t)s_1(t)]=h_{21}$$

Thus, the reception signal vector $R_1=[h_{11},h_{21}]^T$ of user 1 can be calculated.

FIG. 30 is a flowchart showing a reception signal vector calculation method of each user. Referring to FIG. 30, the parameter k indicating the time is set at step SP101. At step SP102, the parameter indicating the antenna element is set to m=1, $e_m=0$. It is to be noted that $e_m$ corresponds to the number of antenna elements. At step SP103, $e_m=e_m+x_m(k)$ $s_j(k)$ is calculated. Here, $x_m(k)$ is the reception signal at time k of the m-th antenna, and $s_j(k)$ is the modulated signal of the j-th user, separated by the adaptive array.

At step SP104, determination is made whether m≧number of antenna elements N. When m is smaller than N, the program proceeds to step SP105 to increment the value of parameter m by 1. Then, the process of steps SP103 and SP104 is repeated.

When the value of parameter m becomes equal to or greater than the number of antenna elements N at step SP104, the program proceeds to step SP106 to determine whether the parameter k indicating the time is equal to or greater than the predetermined number of symbols T for time averaging. When k is smaller than T, the value of k is incremented by 1 at step SP107. Then, the process of steps SP102–SP106 is repeated at the next time. When k=T, the program proceeds to step SP108 to set m=1. At step SP109, $e_m$ is divided by T to obtain an average value $h_{mj}$. When determination is made that m≧N is not established at step SP110, the program proceeds to step SP111 to increment the parameter m by 1. At step SP109, the average value of the next antenna element is obtained. When determination is made that the value of parameter m is N at step SP110, the reception signal vector $R_j=[h_{ij}, \ldots, h_{Nj}]^T$ is output.

FIG. 31 is a flowchart showing a modification of the embodiment of FIG. 30. In the previous example of FIG. 30, reception signal $e_m$ for each antenna element is added in the loop of steps SP103–SP105 to obtain the ensemble average value at step SP109. In the present example of FIG. 31, the calculation of addition and ensemble averaging is obtained at step SP112. The remaining operation is similar to that of FIG. 30.

The method of a reception signal vector calculation method of each user when there are one or more users connected to one time slot is provided in the foregoing. The reception signal vector calculation method for only one user connected to one time slot will be described hereinafter. When there are two antenna elements and one user that is currently connected, the reception signal is represented by the following equations.

$$X(t)=[x_1(t), x_2(t)]^T$$
$$x_1(t)=h_{11}s_1(t)+n_1(t)$$
$$x_2(t)=h_{12}s_1(t)+n_2(t)$$

where $x_1(t)$ is the reception signal of the i-th antenna, $s_i(t)$ is the signal of the first user, $n_1(t)$ is the thermal noise of the i-th antenna, $h_{ij}$ is the phase and amplitude value of the signal of the first user received on the i-th antenna that is varied as a result of the effect of fading and the like. $[\cdot]^T$ represents the transposition of matrix $[\cdot]$.

In the event that the adaptive array operates favorably, $s_i(t)$ is known since the user signal is separated and extracted. The reception signal is divided by the known user signal $s_1(t)$ to calculate the ensemble average (time average) as set forth in the following.

$$E[x_1(t) \div s_1(t)]=h_{11}E[s_1(t) \div s_1(t)]+E[n_1(t) \div s_1(t)]$$

When the average time is sufficient, $E[s_1(t) \div s_1(t)]=1$ is obtained, and $E[n_1(t) \div s_1(t)]=0$ is also obtained by the random property of the noise. Therefore, the vector value $h_{11}$ received on the first antenna of the first user can be represented by the following equation.

$$E[x_1(t) \div s_1(t)]=h_{11}$$

Similarly by sequentially altering the antenna, the following is obtained.

$$E[x_2(t) \div s_1(t)]=h_{21}$$

Thus, the reception signal vector $R_1=[h_{11},h_{21}]^T$ of user 1 can be calculated.

Figure 32:
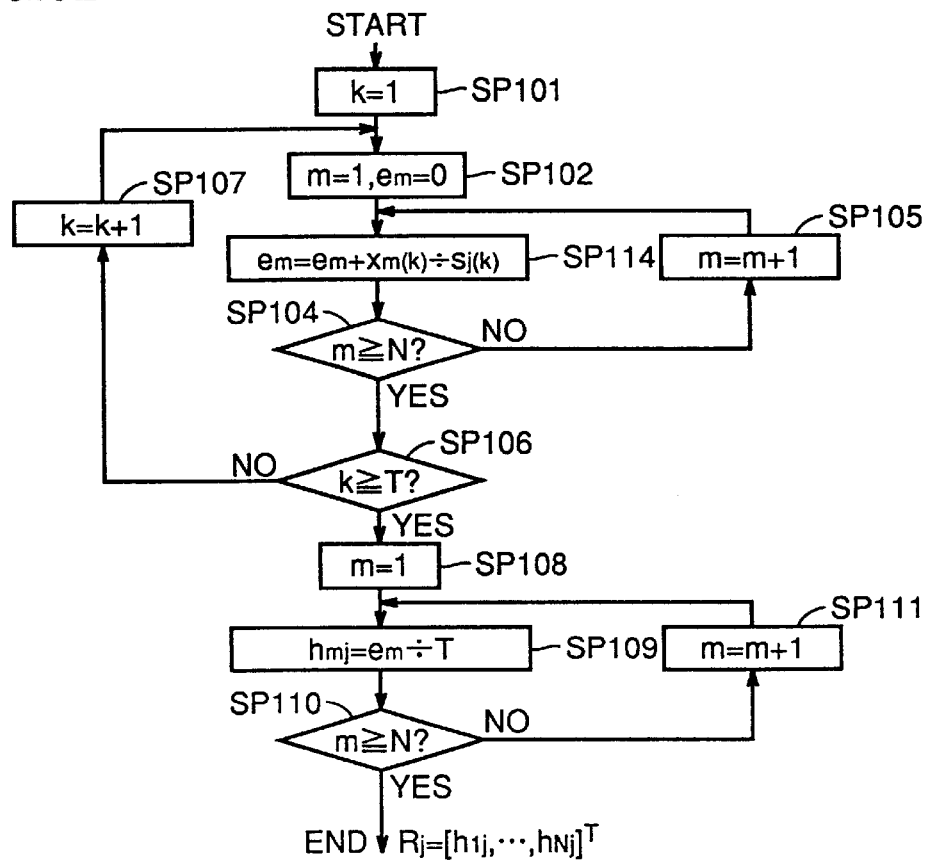
FIG. 32 is a flowchart showing a reception signal vector calculation method of an only one user connected to one time slot.

FIG. 32 is a flowchart for executing the above reception signal vector calculation method. Only step SP114 differs from SP103 of FIG. 30. More specifically, at step SP114, reception signal $x_m(k)$ at time k for each antenna element is divided by the j-th modulated signal $s_j(k)$, and added to reception signal $e_m$. At step SP109, this value is divided by T to obtain $h_{mj}$.

Figure 33:
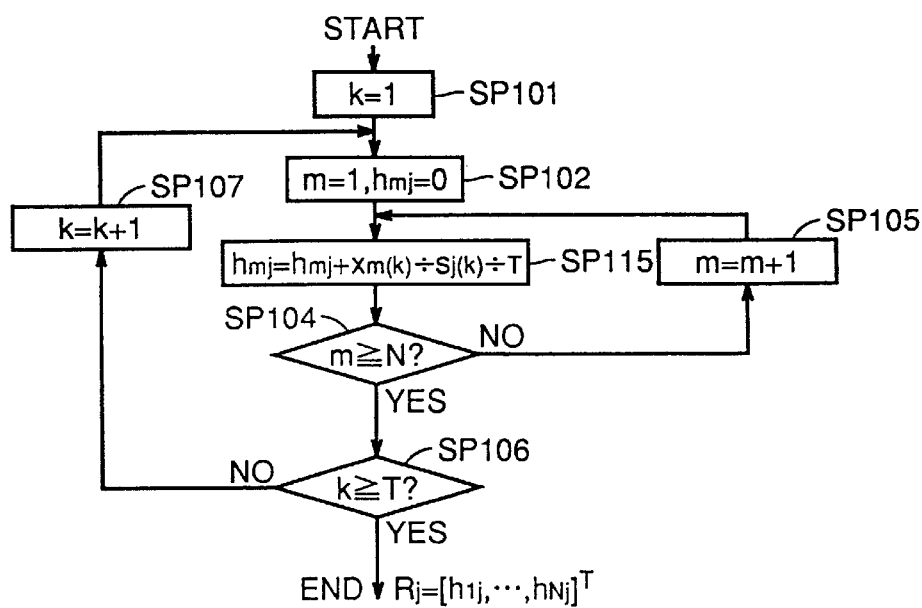
FIG. 33 is a flowchart showing a further modification of the modification of FIG. 31.

FIG. 33 is a flowchart of a modification of FIG. 32, and corresponds to the modification of FIG. 31. More specifically, the division by T at step SP109 of FIG. 32 is carried out at step SP115. The remaining operation is similar to that of FIG. 32.

Figure 47:
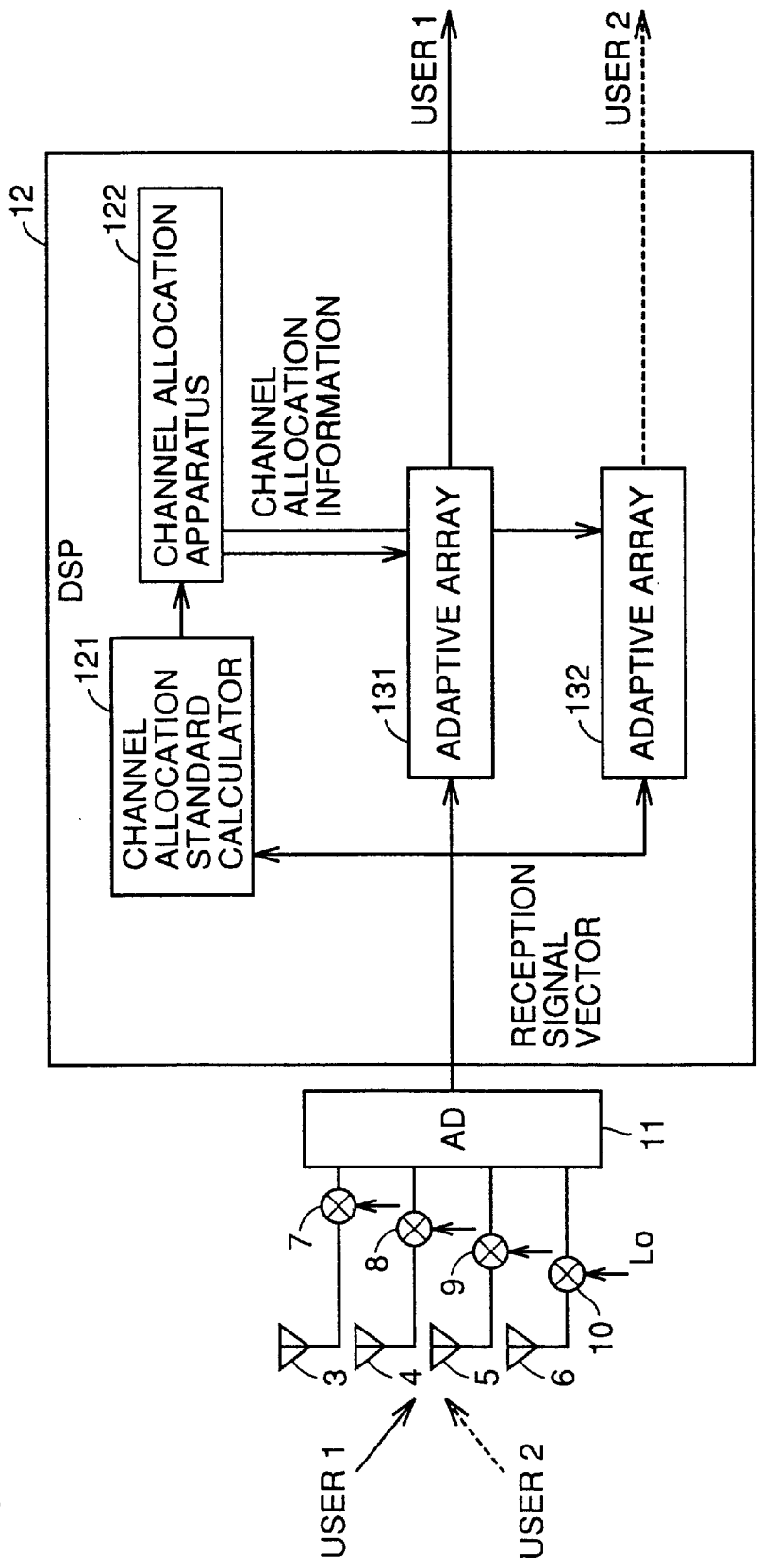
FIG. 47 shows a reception system of a conventional base station for use in PDMA.
Figure 48:
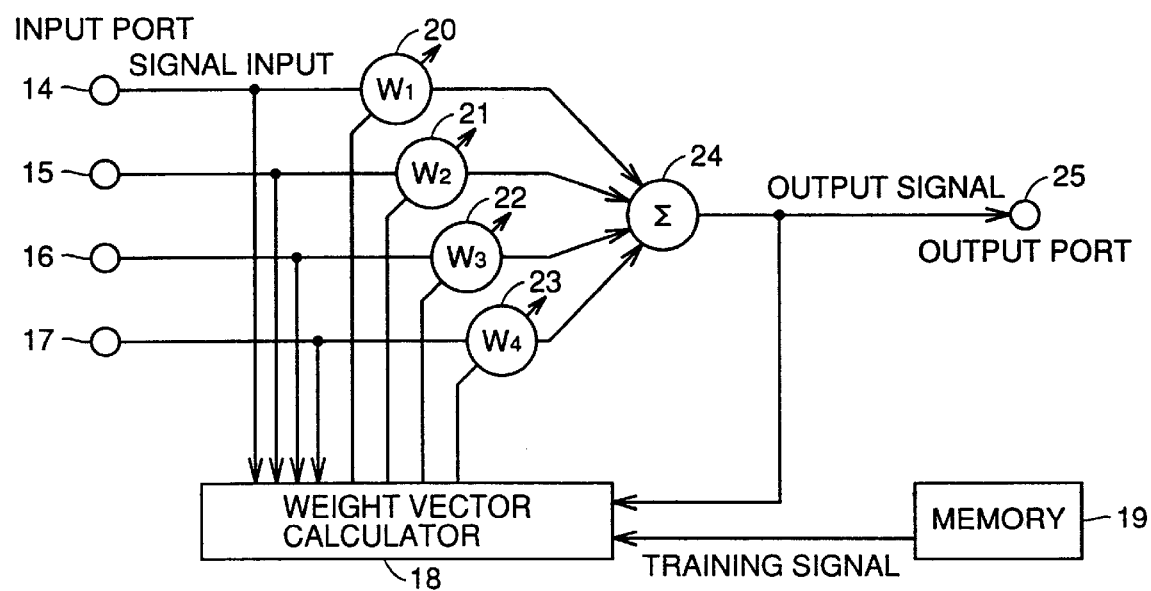
FIG. 48 is a block diagram of a conventional adaptive array.

The above description applies to the case where a plurality of users communicate using the structure of FIG. 47. An embodiment of allocating a channel when one user carries out communication using a plurality of paths will be described hereinafter with reference to FIG. 34.

Figure 34:
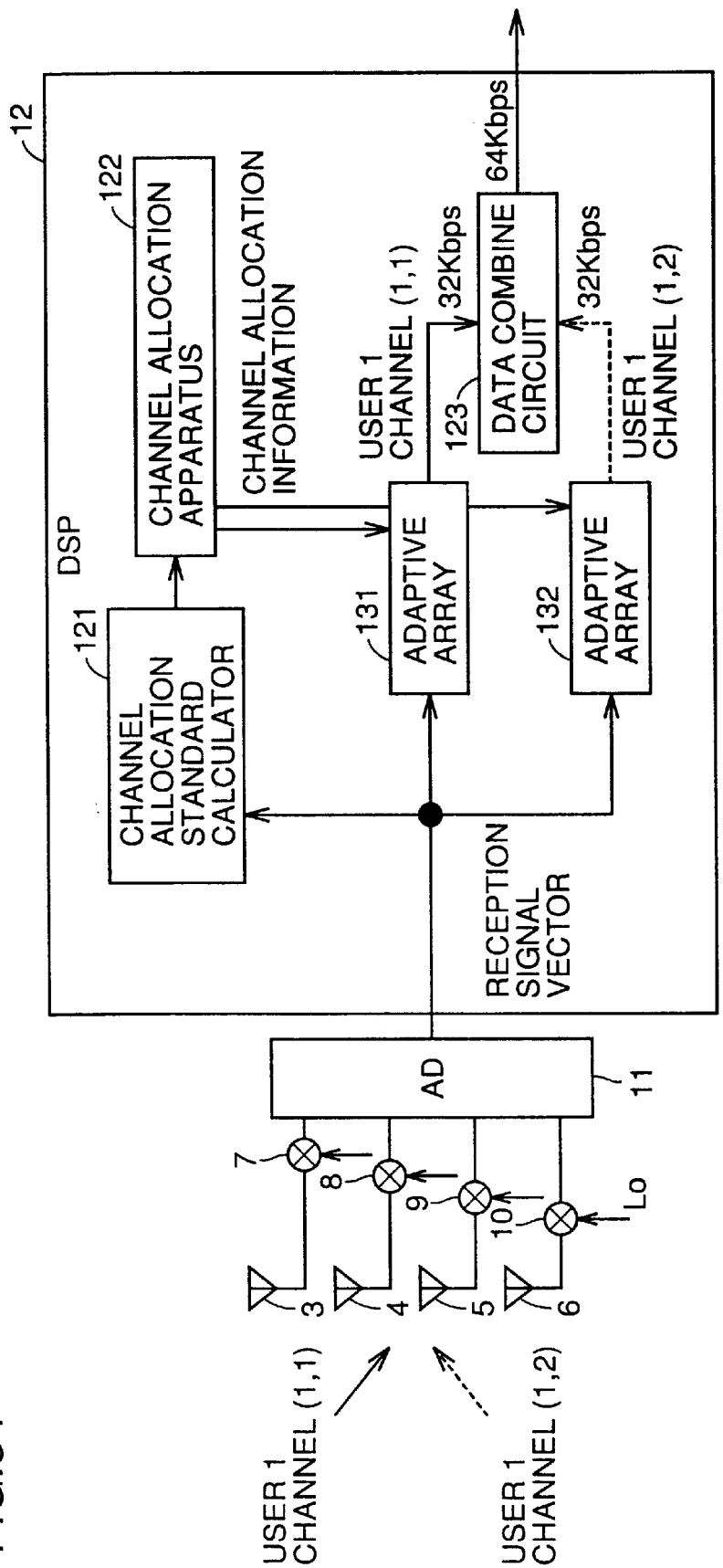
FIG. 34 shows an embodiment where one user effects communication utilizing a plurality of path multiplex channels.

Referring to FIG. 34, DSP12 includes a data combine circuit 123 in addition to channel allocation calculator 121, channel allocation apparatus 122, and adaptive arrays 131 and 132 similar to those of FIG. 47. The signal of channel (1, 1) transmitted from user 1 is extracted from adaptive array 131. A signal sent from the same user 1 communicating through channel (1, 2) and differing from the signal transmitted through channel (1, 1) is extracted from adaptive array 132. Here, a signal of 32 Kbps is applied to data combine circuit 123 as a signal of channel (1, 1), while a signal of 32 Kbps is applied to data combine circuit 123 as a signal of channel (1, 2). Data that is rearranged in a signal series of 64 Kbps is output from data combine circuit 123.

Even if the above-described PDMA system is employed, it is expected that in the near future, the utilization rate of frequency will arrive at its limit due to the intensive spread of portable telephones. In other words, it is expected that there will be no empty channel that can be connected in any of the time slots when there is a connection request from a new user. Eventually, connection will be disallowed. The operation of the mobile communication system will be jeopardized significantly if such a situation is not attended.

One measure for such an invent will be described hereinafter. A reasonable connection priority is established among the users according to the level of the subscriber fee. When there is no empty channel, the user of higher priority is allocated with a channel that was previously allocated to another user of lower priority. The current connection of that user of lower priority is forcedly disconnected.

Figure 35:
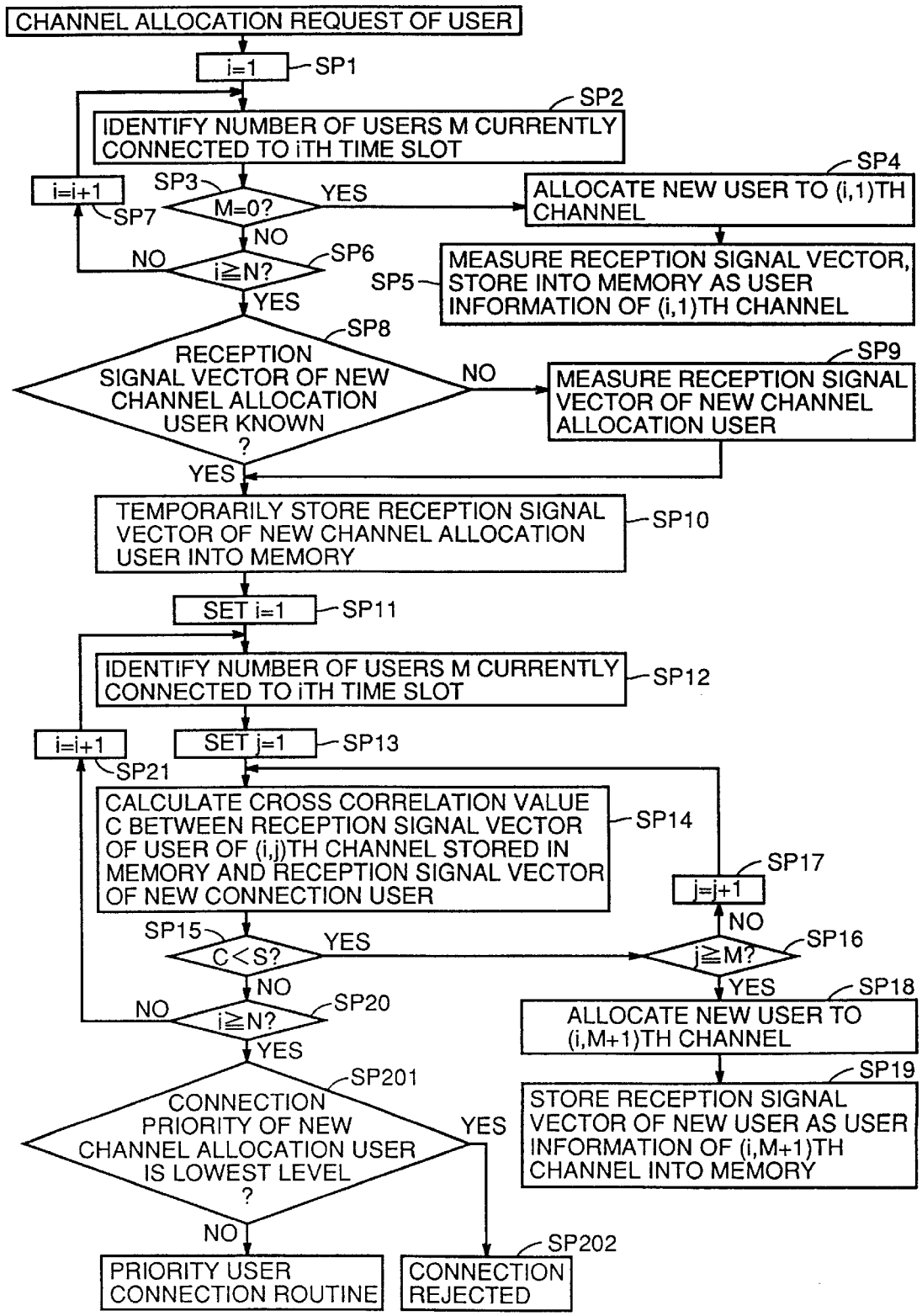
FIGS. 35 and 36 are flowcharts for describing an operation of an embodiment of channel allocation according to priority.
Figure 36:
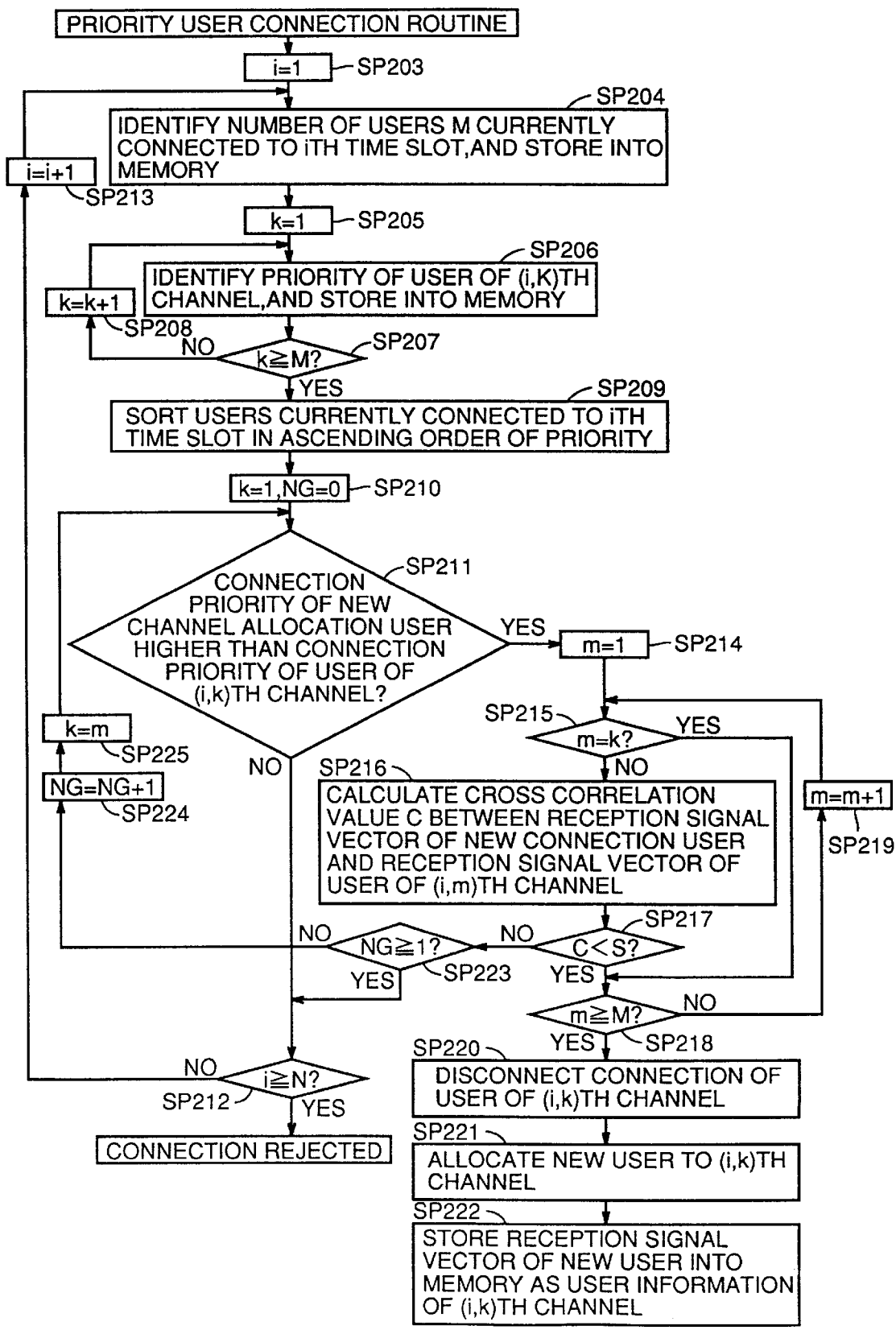

FIGS. 35 and 36 are flowcharts for describing an operation of such an embodiment where channel allocation is carried out according to the level of user priority. The channel allocation operation of FIG. 35 is basically similar to the operation of the first embodiment of FIG. 7 except for the following points.

In the previous first embodiment of FIG. 7, connection of a new user is was disallowed at step SP22 when determination is made that there is no empty channel that can be connected in any of the N time slots at step SP20. In the embodiment of FIG. 35, determination is made whether the user that is newly requesting channel allocation has a predetermined connection priority of the lowest level.

When determination is made that the user requesting channel allocation has the lowest priority, the connection is rejected at step SP202 since there is no chance of allocating a channel from another user to this user. When determination is made at SP201 that the user requesting channel allocation has a priority that is not of the lowest level, the program proceeds to the priority user connection routine of FIG. 36 since there is a possibility of canceling another user of lower priority for channel allocation.

At step SP203 of FIG. 36, i=1 is set in the i direction. At step SP204, the number of users M that is currently connected in time slot 1 is identified and stored in the memory.

At step SP205, k=1 is set in the j direction. At step SP206, the priority level of the user currently connected to channel (i, k)=(1, 1) is identified and stored in the memory. When determination is made that k is smaller than the number of users M at step SP207, the program proceeds to step SP208 to increment k by 1. The priority of the user of channel (1, 2) is identified and stored into the memory.

When the process of steps SP206–SP208 is repeated and determination is made that k arrives at the number of users M at step SP207, the program proceeds to step SP209 to sort all the users connected in time slot 1 in the ascending order of priority. It is to be noted that this sort result is maintained and effective only during this routine. The channel arrangement is not actually modified.

At step SP210, k=1 is set in the j direction. The value of parameter NG indicating the number of connecting users each having a correlation value with the new user exceeding the standard value in one time slot is set to 0. At step SP211, the priority of the user newly requesting channel allocation is compared with the priority of the user that is currently connected to channel (i, k)=(1, 1). When determination is made that the priority of the new user is lower than the priority of the existing user of channel (1, 1), it is appreciated that the priority of the new user is lower than other currently-connected users since the users in this time slot are already sorted in the ascending order of priority at step SP209. Thus, the comparison of the priority at step SP211 is repeated while incrementing the value of i by 1 at step SP213 until determination is made that the value of i equals the time slot number N at step SP212.

When determination is made at step SP211 that the priority of the new user is higher than that of the existing user of channel (1, k), the program proceeds to step SP214 to set m=1 in the j direction. Determination is made whether m=k at step SP215. At step SP216, the cross correlation value C between the reception signal vector of the new user and the reception signal vector of the user of channel (1, m) where m≠k is calculated.

At step SP217, determination is made whether cross correlation value C obtained at step SP216 is smaller than standard value S which is the determination standard of interference occurrence between the signals. When determination is made that cross correlation value C is smaller than standard value S, it is appreciated that substantial interference will not occur between the signal of the new user and the signal of the user of channel (1, m) even when channel (1, k) in time slot 1 is allocated to the new user.

The process of steps SP215–SP218 is repeated while incrementing the value of in by 1 at step SP219 until determination is made of m equaling number of users M at step SP218. Thus, determination is made whether substantial interference occurs or not with the signal of the new user of all the channels (1, m) other than m=k in time slot 1.

When determination is made that m arrives at M at step SP2 18 and that there is no occurrence of substantial interference within time slot 1, the program proceeds to step SP220 to forcedly disconnect the user connected to channel (1, k). At step SP221, channel (1, k) is allocated to the new user. At step SP222, the reception signal vector of the new user is stored into the memory as the user information of channel (1, k).

When determination is made at step SP217 that cross correlation value C is not smaller than standard value S for any channel (1, m) in time slot 1 so that there is occurrence of substantial interference within time slot 1, the program proceeds to step SP223 to determine whether NG≧1 is satisfied. The value of NG is incremented by 1 at step SP224 since NG=0is set. At step SP225, k=m is set. Then, determination is made of the priority at step SP211. More specifically, since one user that is currently connected and that has a correlation value with respect to the new user exceeding the standard value within the same time slot is identified, the new user can have the channel exchanged with only that connecting user. Therefore, determination of the priority is carried out again with k=m.

When C<S is determined again at step SP217, the program proceeds to step SP223 to determine NG≧1. In other words, determination is made that there are two or more connecting users that have a correlation value with the new user exceeding the standard value in the same time slot. In this case, if the new user is substituted for either one of the connecting users, the cross correlation amount with another user will become too great. As a result, conversation is disabled. Therefore, in this case, allocation for the new user within that time slot is interrupted to identify the possibility of allocation at the next time slot.

When determination is made that i has not arrived at time slot number N at step SP212, the program proceeds to step SP213 to increment i by 1. Then, the process of steps SP204–SP225 is carried out for the next time slot.

When determination is made that the new user has a priority higher than a user connected to any of the channels in one time slot, and confirmation is made at steps SP214–SP225 that substantial interference does not occur with any user connected to another channel in that time slot, the program proceeds to step SP220 to forcedly disconnect the user of the low priority of that channel. At step SP221, that channel is allocated to the new user.

By discriminating users by a reasonable basis such as the subscriber's fee, effective operation of the system can be implemented when the channel capacity of the mobile communication system approaches its limit.

Figure 37:
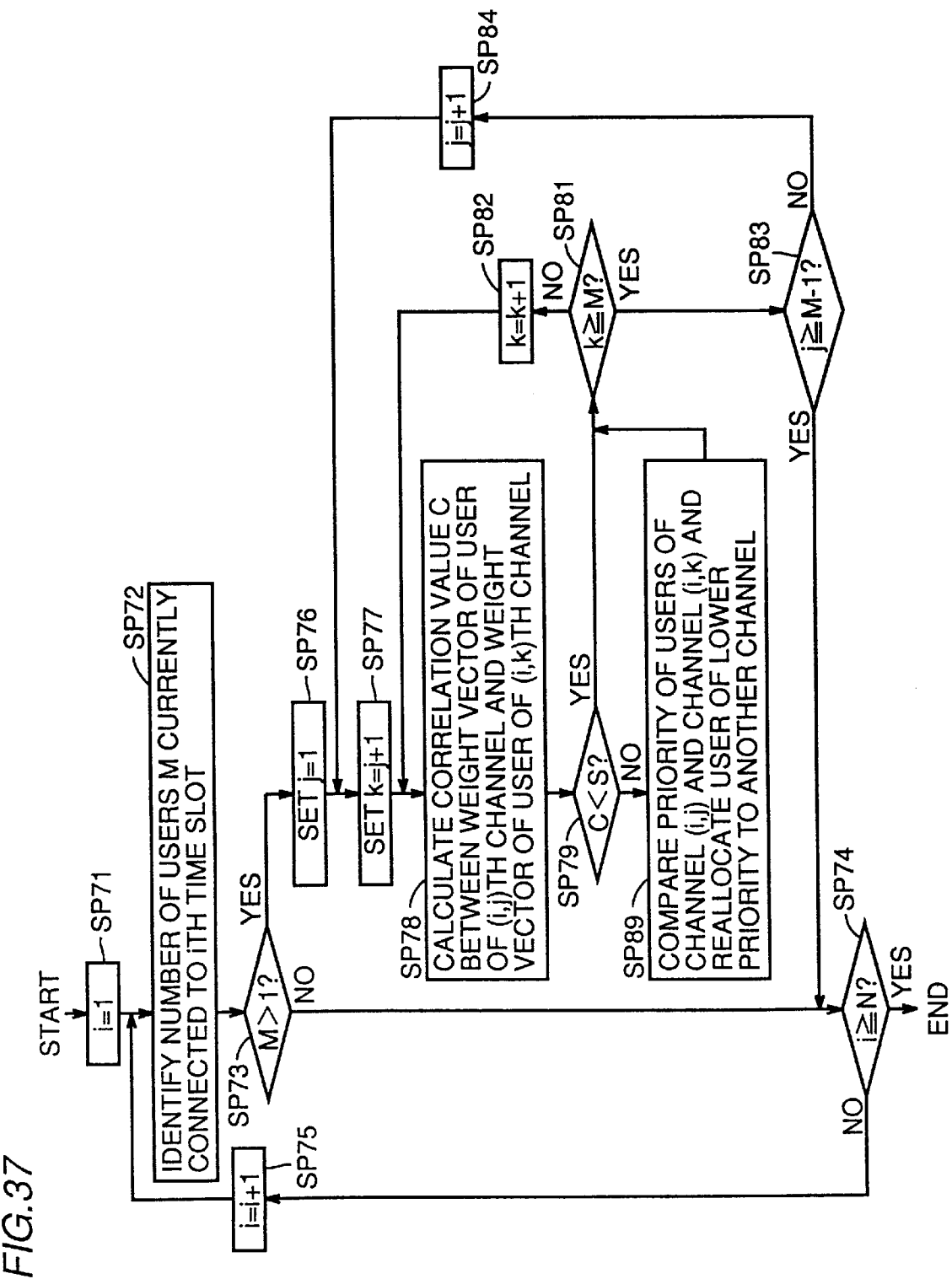
FIG. 37 is a flowchart for describing an operation of an embodiment of channel reallocation according to priority.

FIG. 37 shows a flow chart of determining the user that is to be shifted to another channel according to a predetermined priority when interference occurs between the signals of the users due to the user moving during communication. The flowchart of FIG. 37 basically corresponds to the seventh embodiment of FIG. 22.

The embodiment of FIG. 37 is similar to that of the seventh embodiment of FIG. 22 except for the following points. When determination is made of signal interference between channel (i,j) and channel (i, k) belonging to the same time slot in the seventh embodiment of the previous FIG. 22, the program proceeds to step SP80 to shift the user connected to channel (i, k) to the channel of another time slot. In contrast, when determination is made of substantial interference between two channels belonging to the same time slot in the embodiment of FIG. 37, the priority of the users connected to these two channels are compared at step SP89. The user of the lower priority is shifted to the channel of another time slot. The user of the higher priority is admitted to remain in the currently-connecting channel. Thus it is not necessary to enter a reallocation operation of another channel and there is no possibility of the connection being disallowed.

Therefore, a reasonable operation of a mobile communication system can be implemented.

When the data communication rate of one user is to be several times faster in the above-described PDMA communication system, the approach of allocating channels 1 and 2 of frequency f1 of FIG. 46C to one user can be considered. In the following embodiment, channels (1, 1) and (1, 2) in the path multiplex direction are allocated to one user.

Figures 38A, 38B:
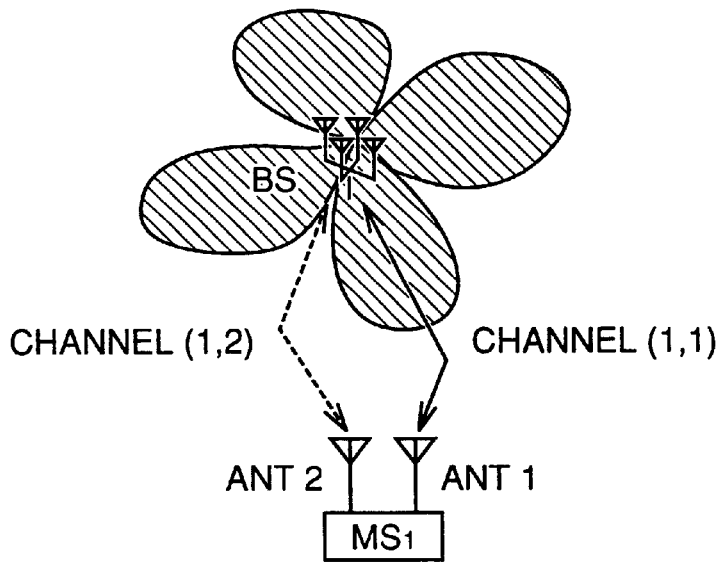
FIGS. 38A and 38B show the state where a base station is communicating with a mobile terminal device through a channel (1, 1) by path multiplex communication.
Figures 39A, 39B:
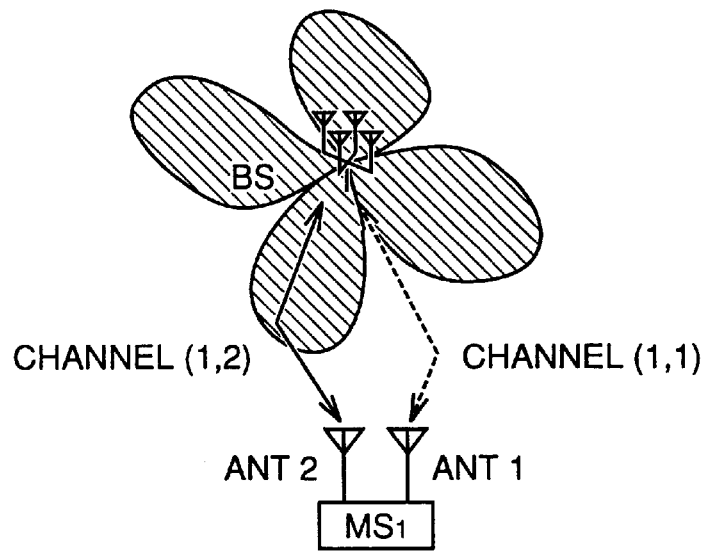
FIGS. 39A and 39B show the state where a base station is communicating with a mobile terminal device through a channel (1, 2) by path multiplex communication.

FIGS. 38A, 38B, 39A and 39B are diagrams for describing the concept of path multiplex high speed communication using an adaptive array. FIGS. 38A and 38B show the state where a base station BS and a mobile terminal device MS1 communicate through channel (1,1). FIGS. 39A and 39B show the state where base station BS and mobile terminal device MS1 communicate through channel (1, 2).

Mobile terminal device MS1 includes two antennas ANT1 and ANT2. The signals of channels (1, 1) and (1, 2) are transmitted path multiplex by antennas ANT1 and ANT2, respectively. Base station BS is formed as shown in FIG. 34 or 47. In a reception mode, the signals of a plurality of channels including channels (1, 1) and (1, 2) are received. The signals of respective channels are separated by the adaptive arrays.

In communication between base station BS and mobile terminal device MS1 through channel (1, 1), the signal of channel (1, 1) is transmitted by antenna ANTi of mobile terminal device MS1. Base station BS sets the reception weight vector so that an array antenna directional pattern as shown in FIG. 38A is formed with respect to channel (1, 1).

In a transmission mode, base station BS sets the transmission weight vector so as to form a transmission array antenna directional pattern as shown in FIG. 38A on the basis of the reception directional pattern formed at the time of reception, i.e. the reception weight vector, to transmit a signal, Mobile terminal device MS 1 receives only the signal of channel (1, 1) in a signal reception mode using antenna ANTi, and detects the signal in a general manner. Therefore, the user can establish communication through channel (1, 1) as shown in FIG. 38B.

When base station BS and mobile terminal device MS1 are to communicate through channel (1, 2), the signal of channel (1, 2) is transmitted by antenna ANT2 of mobile terminal device MS1. Base station BS sets the reception weight vector so as to form an array antenna directional pattern as shown in FIG. 39A with respect to channel (1, 2).

In a transmission mode, base station BS sets a transmission weight vector so as to form a transmission directional pattern as shown in FIG. 39A on the basis of the reception array antenna directional pattern formed at the time of reception, i.e. the reception weight vector, to transmit a signal. Mobile terminal device MS1 receives only the signal of channel (1, 2) in a signal reception mode using antenna ANT2, and detected in a general manner. Therefore, the user can establish communication through channel (1, 2) as shown in FIG. 39B. Thus, path multiplex communication is allowed as shown in FIGS. 38A, 38B, 39A and 39B.

The receiver device of the base station for implementing path multiplex communication has a structure as shown in FIG. 34. Referring to FIG. 34, DSP12 of the receiver includes a channel allocation standard calculator 121, a channel allocation apparatus 122, adaptive arrays 131 and 132 as well as a data combine circuit 123.

Adaptive array 131 extracts the signal of channel (1, 1) of user 1. Adaptive array 132 extracts the signal of channel (1, 2) of the same user 1. In this embodiment, signals of 32 Kbps are applied to data combine circuit 123 through channel (1, 1) and channel (1, 2), respectively. Data rearranged in a signal series of 64 Kbps is output from data combine circuit 123.

Figure 40:
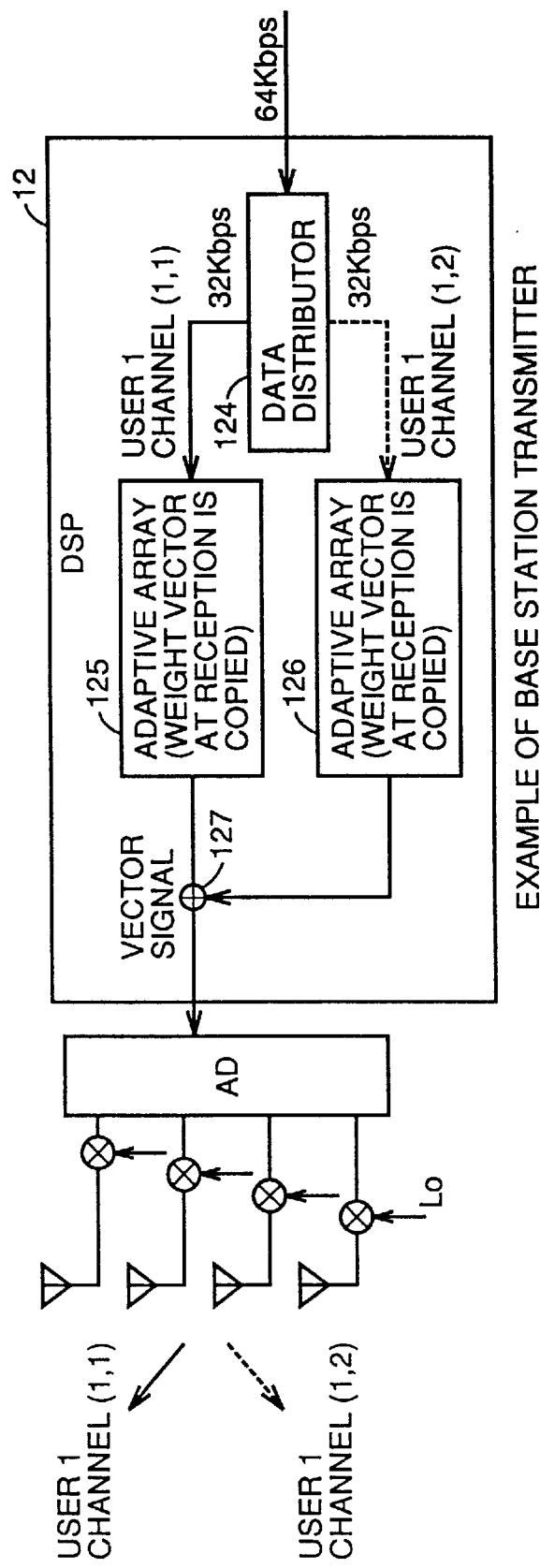
FIG. 40 is a block diagram showing the structure of a transmitter of a base station.

FIG. 40 is a block diagram of a transmitter device of a base station. Referring to FIG. 40, a data distributor 124, adaptive arrays 125 and 126, and an adder 127 are provided in DSP12. Data distributor 124 divides high rate data of, for example, 64 Kbps, into a size that can be transmitted in one channel, for example, into 32 Kbps. The first 32 Kbps data is applied to adaptive array 125 for transmission through channel (1, 1). The next 32 Kbps data is applied to adaptive array 126 for communication through channel (1, 2). Adaptive arrays 125 and 126 use a copy of the weight vectors of the reception mode or an optimum transmission weight vectors obtained by calculation on the basis of the weight vectors in the reception mode, for the weighting of respective antenna elements at the time of transmission. The outputs of adaptive arrays 125 and 126 are combined by adder 127 and then transmitted.

Figure 41:
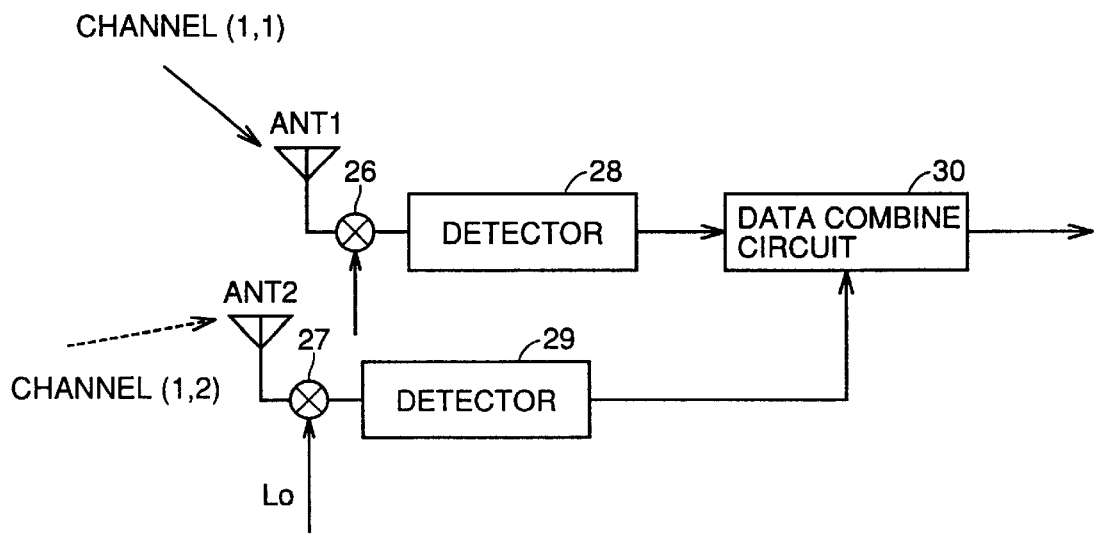
FIG. 41 is a block diagram showing the structure of a receiver of a mobile terminal device.
Figure 42:
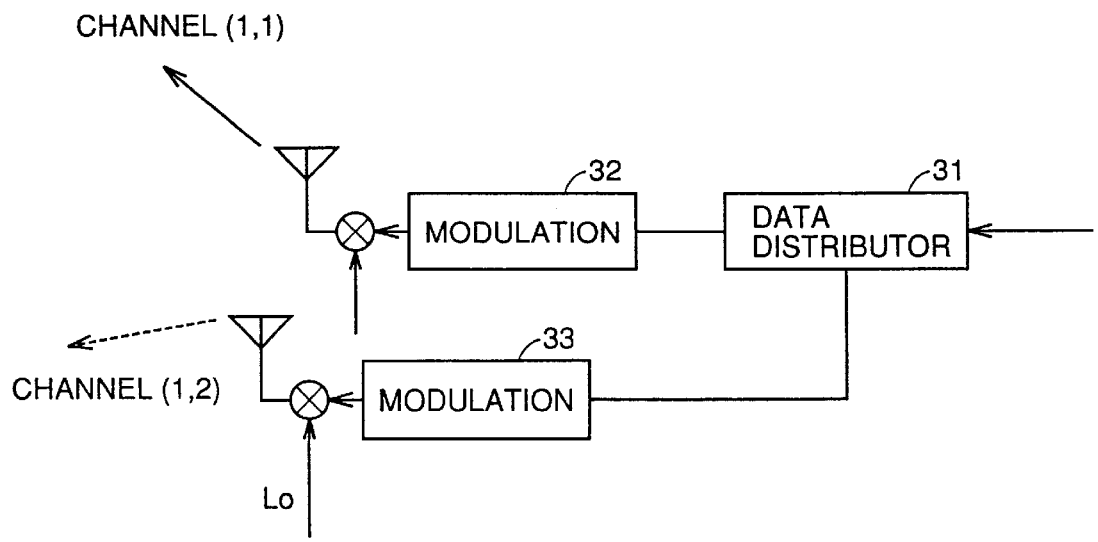
FIG. 42 is a block diagram showing the structure of a transmitter of a mobile terminal device.

FIGS. 41 and 42 are block diagrams showing a structure of a receiver and a transmitter, respectively, of mobile terminal device MS1.

Referring to FIG. 41, a signal received on antenna ANT1 of mobile terminal device MS1 is frequency-converted by a frequency conversion circuit 26. The converted signal is detected by detector circuit 28 and applied to a data combine circuit 30. The signal received on antenna ANT2 is frequency-converted by a frequency conversion circuit 27. This converted signal is detected by a detector circuit 29 and applied to data combine circuit 30. Every 32 Kbps data that is distributed for each channel from base station BS is rearranged to the former signal series of 64 Kbps.

Referring to FIG. 42 showing a transmitter of mobile terminal device MS1, data distributor 31 divides the high rate data into a size that can be transmitted by one channel. Each divided data is modulated by modulation circuits 32 and 33, and then subjected to path multiplex through channels (1, 1) and (1, 2) from antennas ANT1 and ANT2 for transmission.

Figure 43:
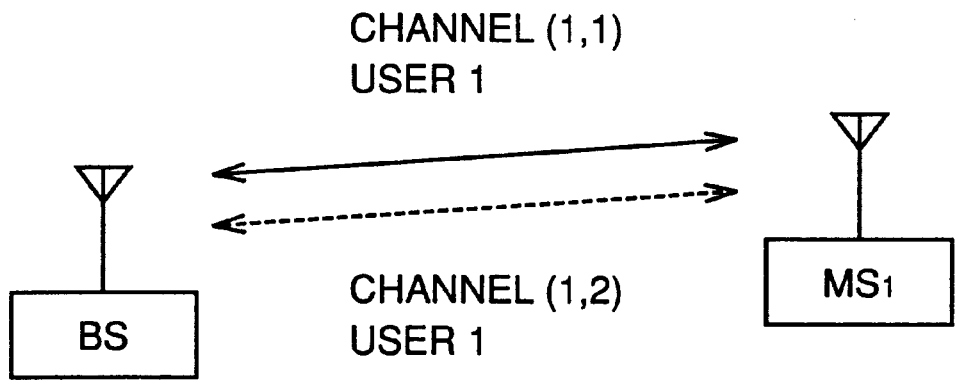
FIG. 43 shows the concept of data transmission between a base station and a mobile terminal device.
Figure 44:
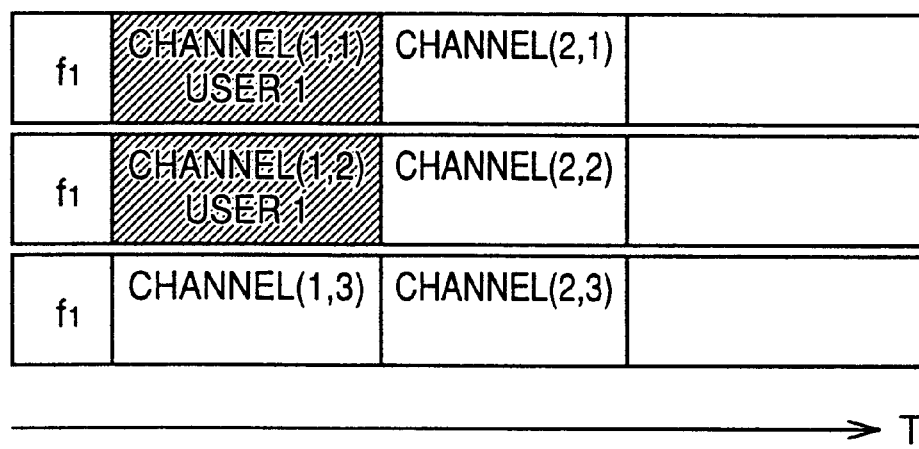
FIG. 44 shows the position relationship of respective channels when communication is established between a base station and a mobile terminal device through channels (1, 1) and (1, 2) by path multiplex communication.

FIGS. 43 and 44 are diagrams for describing another embodiment of the present invention. In this embodiment, the present invention is implemented using an interference canceller.

FIG. 43 is a diagram showing the concept of data transfer between base station BS and mobile terminal device MS1. FIG. 44 shows the position relationship of channels (1, 1) and (1, 2) when communication is established between base station BS and mobile terminal device MS1 through these channels.

Data of user 1 is transmitted through channels (1, 1) and (1, 2) from mobile terminal device MS1 to base station BS. Base station BS receives the signals including channels (1, 1) and (1, 2) from mobile terminal device MS1. The signals of respective channels are separated using the interference canceller.

Base station BS transmits a signal through channels (1, 1) and (1, 2) to mobile terminal device MS1. Mobile terminal device MS1 separates the received signals of respective channels using an interference canceller.

Figure 45A:
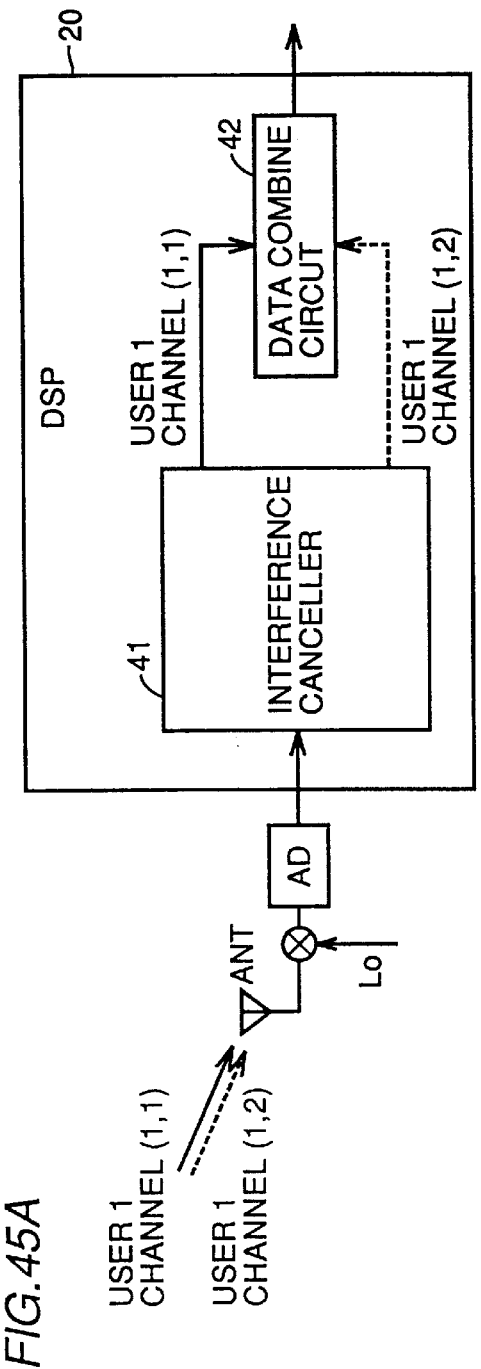
FIGS. 45A and 45B are block diagrams showing the structures of a receiver and a transmitter in each of a base station and a mobile terminal device.
Figure 45B:
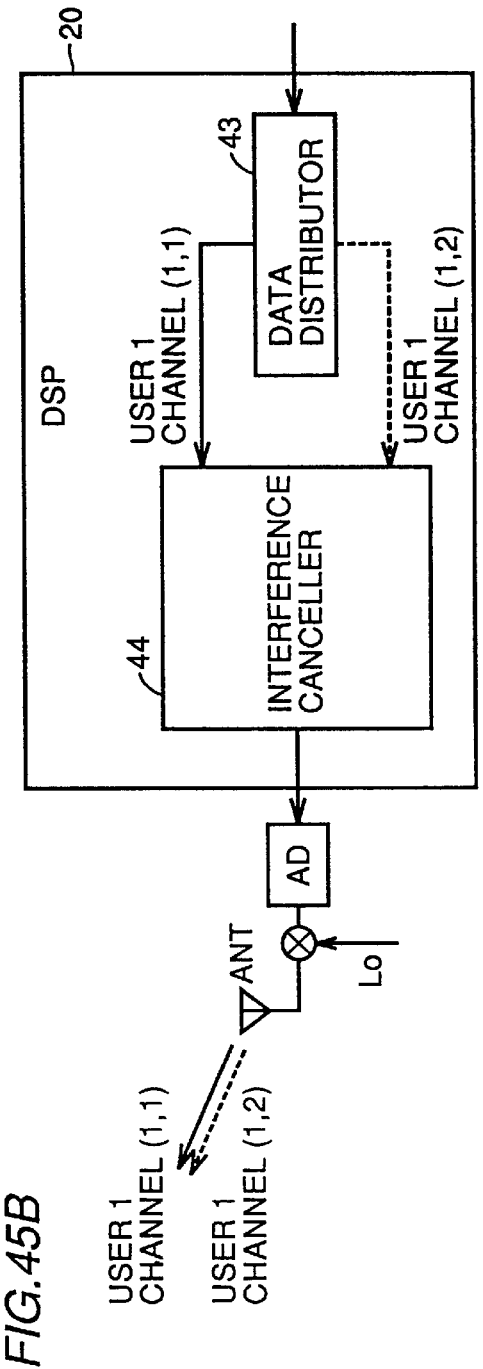

FIGS. 45A and 45B are block diagrams showing a structure of a transmitter and a receiver of the present embodiment. FIG. 45A corresponds to a receiver whereas FIG. 45B corresponds to a transmitter.

The transmitter and receiver shown in FIGS. 45A and 45B are used commonly by base station BS and mobile terminal device MS1. DSP20 of the receiver shown in FIG. 45A includes an interference canceller 41 and a data combine circuit 42. The signals of channels (1, 1) and (1, 2) received on antenna ANT are separated for every 32 Kbps, for example, by interference canceller 41. Then, the signals are rearranged in the former form of signals of 64 Kbps by data combine circuit 42.

At the transmitter shown in FIG. 45B, DSP20 includes a data distributor 43 and an interference canceller 44. A data array of, for example, 64 Kbps, is divided for every 32 Kbps by data distributor 43, and then sent from interference canceller 44 through antenna ANT using channels (1, 1) and (1, 2).

According to the present embodiment, data can be transferred by path multiplex communication where one user uses a plurality of channels belonging to the same frequency and same time slot. In the PDMA communication system, data transmission and reception at high speed can be realized.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of allocating, to a plurality of terminal devices, respective ones of a plurality of channels for multiple connection to a base station respectively in response to connection requests from said plurality of terminal devices, said method comprising the steps of:

determining whether interference occurs between signals of said plurality of terminal devices, and allocating channels in which interference does not substantially occur to said plurality of terminal devices according to said determination result;

said step of determining whether interference occurs includes measuring an interference amount of said signals between channels belonging to the same frequency and same time slot; wherein said step of measuring an interference amount includes calculating a correlation value of reception signal vectors between said signals as said interference amount.

2. A method of allocating, to a plurality of terminal devices, respective ones of a plurality of channels for multiple connection to a base station respectively in response to connection requests from said plurality of terminal devices, said method comprising the steps of:

determining whether interference occurs between signals of said plurality of terminal devices, and allocating channels in which interference does not substantially occur to said plurality of terminal devices according to said determination result;

said step of determining whether interference occurs includes measuring an interference amount of said signals between channels belonging to the same frequency and same time slot; wherein said step of measuring an interference amount includes calculating a correlation value of weight vectors between said signals as said interference amount.

3. A method of allocating, to a plurality of terminal devices, respective ones of a plurality of channels for multiple connection to a base station respectively in response to connection requests from said plurality of terminal devices, said method comprising the steps of:

determining whether interference occurs between signals of said plurality of terminal devices, and allocating channels in which interference does not substantially occur to said plurality of terminal devices according to said determination result;

said step of determining whether interference occurs includes measuring an interference amount of said signals between channels belonging to the same frequency and same time slot; wherein said step of measuring an interference amount includes calculating a direction of arrival difference between said signals as said interference amount.

4. A method of allocating, to a plurality of terminal devices, respective ones of a plurality of channels for multiple connection to a base station respectively in response to connection requests from said plurality of terminal devices, comprising the steps of:

determining whether interference occurs between a signal of a one of the terminal devices that has already been connected and a signal of one of the terminal devices that is newly requesting connection, and allocating an empty channel in which interference does not substantially occur to said terminal device newly requesting connection; wherein connection priority is pre-assigned to said plurality of terminal devices, and further comprising the step of forcedly allocating a channel that is allocated to an already-connected terminal device of lower priority to said terminal device of higher priority newly requesting connection as long as interference does not substantially occur when there is no said empty channel to be allocated.

5. A method of allocating, to a plurality of terminal devices, respective ones of a plurality of channels for multiple connection to a base station respectively in response to connection requests from said plurality of terminal devices, comprising the steps of:

determining whether interference occurs between signals of terminal devices that have already been connected, and shifting one terminal device to another channel in which interference does not substantially occur when said interference occurs between signals of said terminal devices that have already been connected; wherein a connection priority is pre-assigned to said plurality of terminal devices, and said step of shifting comprises the step of shifting a terminal device of lower priority out of terminal devices causing interference.

6. An apparatus for allocating, to a plurality of terminal devices, respective ones of a plurality of channels for multiple connection to a base station respectively in response to connection requests from said plurality of terminal devices, comprising:

means for determining whether interference occurs between signals of said plurality of terminal devices, and means for allocating channels in which interference does not substantially occur to said plurality of terminal devices according to said determination result; wherein said means for determining whether interference occurs includes means for measuring an interference amount of said signals between channels belonging to the same frequency and same time slot; wherein said means for measuring an interference amount includes means for calculating a correlation value of reception signal vectors between said signals as said interference amount.

7. An apparatus for allocating, to a plurality of terminal devices, respective ones of a plurality of channels for multiple connection to a base station respectively in response to connection requests from said plurality of terminal devices, comprising:

means for determining whether interference occurs between signals of said plurality of terminal devices, and means for allocating channels in which interference does not substantially occur to said plurality of terminal devices according to said determination result; wherein said means for determining whether interference occurs includes means for measuring an interference amount of said signals between channels belonging to the same frequency and same time slot; wherein said means for measuring an interference amount includes means for calculating a correlation value of weight vectors between said signals as said interference amount.

8. An apparatus for allocating, to a plurality of terminal devices, respective ones of a plurality of channels for multiple connection to a base station respectively in response to connection requests from said plurality of terminal devices, comprising:

means for determining whether interference occurs between signals of said plurality of terminal devices, and means for allocating channels in which interference does not substantially occur to said plurality of terminal devices according to said determination result; wherein said means for determining whether interference occurs includes means for measuring an interference amount of said signals between channels belonging to the same frequency and same time slot; wherein said means for measuring an interference amount includes means for calculating an incoming signal between said signals as said interference amount.

9. A method of allocating, to a plurality of terminal devices, respective ones of a plurality of channels for multiple connection to a base respectively in response to connection requests from said plurality of terminal devices, comprising the steps of:

setting in a time axis direction a plurality of time slots, each time slot having a plurality of channels in a path multiplex direction, allocating one of the channels of an empty time slot in the time axis direction to a terminal device newly requesting connection, and allocating an empty channel in the path multiplex direction to said terminal device newly requesting connection after there is no empty time slot in the time axis direction.

10. The method according to claim 9, further comprising the step of allocating an empty channel in the path multiplex direction while shifting the timing in the time axis direction.

11. A method of allocating to a plurality of terminal devices channels for multiple connection to a base station respectively in response to connection requests from said plurality of terminal devices, comprising the steps of:

setting in a time axis direction a plurality of time slots, each time slot having a plurality of channels in a path multiplex direction, allocating an empty channel in the path multiplex direction to a terminal device newly requesting connection, and allocating a channel of an empty time slot in the time axis direction to said terminal device newly requesting connection after there is no empty channel in the path multiplex direction.

12. A method of allocating, to a plurality of terminal devices including a terminal device adapted to multiple connection and a terminal device not adapted to multiple connection, respective ones of a plurality of channels for connection to a base station respectively in response to connection requests from said plurality of terminal devices, comprising the steps of:

setting in a time axis direction a plurality of time slots, each time slot having a plurality of channels in a path multiplex direction, allocating a dedicated time slot to said terminal device not adapted to multiple connection but newly requesting connection, and allocating another time slot to said terminal device adapted to multiple connection and newly requesting connection; wherein said step of allocating another time slot includes the steps of allocating an empty time slot in the time axis direction to said terminal device adapted to multiple connection and newly requesting connection, and allocating an empty channel in the path multiplex direction to said terminal device adapted to multiple connection and newly requesting connection after there is no empty time slot in the time axis direction.

13. A method of allocating, to a plurality of terminal devices including a terminal device adapted to multiple connection and a terminal device not adapted to multiple connection, respective ones of a plurality of channels for connection to a base station respectively in response to connection requests from said plurality of terminal devices, comprising the steps of:

setting in a time axis direction a plurality of time slots, each time slot having a plurality of channels in a path multiplex direction, allocating a dedicated time slot to said terminal device not adapted to multiple connection but newly requesting connection, and allocating another time slot to said terminal device adapted to multiple connection and newly requesting connection; wherein said step of allocating another time slot includes the steps of allocating an empty channel in the time path multiplex direction to said terminal device adapted to multiple connection and newly requesting connection, and allocating a channel of an empty one of the time slots in the time axis direction to said terminal device adapted to multiple connection and newly respecting connection after there is no empty channel in the path multiplex direction.

14. A method of allocating, to a plurality of terminal devices including a terminal device adapted to multiple connection and a terminal device not adapted to multiple connection, respective ones of a plurality of channels for connection to a base station respectively in response to connection requests from said plurality of terminal devices, comprising the steps of:

setting in a time axis direction a plurality of time slots, each time slot having a plurality of channels in a path multiplex direction, allocating a dedicated time slot to said terminal device not adapted to multiple connection but newly requesting connection, and allocating another time slot to said terminal device adapted to multiple connection and newly requesting connection; wherein said dedicated time slot allocated to said terminal device not adapted to multiple connection is a predetermined time slot.

15. A method of allocating, to a plurality of terminal devices including a terminal device adapted to multiple connection and a terminal device not adapted to multiple connection, respective ones of a plurality of channels for connection to a base station respectively in response to connection requests from said plurality of terminal devices, comprising the steps of:

setting in a time axis direction a plurality of time slots, each time slot having a plurality of channels in a path multiplex direction, allocating a dedicated time slot to said terminal device not adapted to multiple connection but newly requesting connection, and allocating another time slot to said terminal device adapted to multiple connection and newly requesting connection; wherein said dedicated time slot allocated to said terminal device not adapted to multiple connection is a time slot that is determined appropriately.

* * * * *